(12) United States Patent
Ramos et al.

(10) Patent No.: US 9,552,129 B2
(45) Date of Patent: Jan. 24, 2017

(54) INTERACTIVE VISUAL REPRESENTATION OF POINTS OF INTEREST DATA

(75) Inventors: Gonzalo A. Ramos, Kirkland, WA (US); Timothy P. Wantland, Bellevue, WA (US); Donald A. Barnett, Monroe, WA (US); Romualdo T. Impas, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/429,232

(22) Filed: Mar. 23, 2012

(65) Prior Publication Data

US 2013/0249812 A1   Sep. 26, 2013

(51) Int. Cl.
*G06F 3/0481* (2013.01)
*G01C 21/36* (2006.01)

(52) U.S. Cl.
CPC ........... *G06F 3/0481* (2013.01); *G01C 21/367* (2013.01); *G01C 21/3679* (2013.01); *G01C 21/3682* (2013.01); *G06F 2203/04806* (2013.01)

(58) Field of Classification Search
CPC ................ G06F 3/04817; G06F 3/0481; G06F 2203/04806; G01C 21/367; G01C 21/3679; G01C 21/3644; G01C 21/3673; G01G 21/3682
(Continued)

(56) References Cited

U.S. PATENT DOCUMENTS 4,574,364 A   3/1986 Tabata et al.
5,497,454 A   3/1996 Bates et al.
(Continued)

FOREIGN PATENT DOCUMENTS

JP   2008-051538 A   3/2008
KR   20030037453   5/2003

OTHER PUBLICATIONS

Ying Xia; Xi Peng, "A clustering algorithm based on Delaunay Triangulation," Intelligent Control and Automation, 2008. WCICA 2008. 7th World Congress on , vol., No., pp. 4517,4521, Jun. 25-27, 2008 doi: 10.1109/WCICA.2008.4593651 keywords: {mesh generation;pattern clustering;Delaunay triangulation;clustering algorithm;data structure;density data sets.*
(Continued)

*Primary Examiner* — Kieu Vu
*Assistant Examiner* — Blaine Basom
(74) *Attorney, Agent, or Firm* — Steven Spellman; Tom Wong; Micky Minhas

(57) ABSTRACT

Search results may be rendered on a map utilizing one or more points of interest. An individual point of interest may include a casing layer and a core layer. Casing layers and/or core layers may be configured to change in size and color at different levels of detail associated with zoom operations. Zoom operations may further include de-clustering overlapping points of interest to eliminate overlap. A hover input associated with a cluster may render a numerical value associated with a corresponding number of points of interest that appear in the cluster. Various embodiments provide a visual language that enables a continuous representation, at different levels of detail, that range from a single discrete point to multiple points that are near each other or clustered together to unify the look-and-feel of represented elements and provide interactive consistency across various map properties and platforms.

20 Claims, 22 Drawing Sheets

(58) Field of Classification Search
USPC .................................................... 715/846
See application file for complete search history.

(56) References Cited

U.S. PATENT DOCUMENTS

| | | | |
|---|---|---|---|
| 5,499,334 | A | 3/1996 | Staab |
| 5,519,809 | A | 5/1996 | Husseiny et al. |
| 5,561,757 | A | 10/1996 | Southgate |
| 5,590,265 | A | 12/1996 | Nakazawa |
| 5,651,107 | A | 7/1997 | Frank et al. |
| 5,758,264 | A | 5/1998 | Bonta et al. |
| 5,852,810 | A | 12/1998 | Sotiroff et al. |
| 5,945,985 | A | 8/1999 | Babin et al. |
| 6,040,833 | A | 3/2000 | Henshaw |
| 6,075,531 | A | 6/2000 | DeStefano |
| 6,092,076 | A | 7/2000 | McDonough et al. |
| 6,222,537 | B1* | 4/2001 | Smith et al. .............. 715/762 |
| 6,405,129 | B1 | 6/2002 | Yokota |
| 6,549,218 | B1 | 4/2003 | Gershony et al. |
| 6,640,185 | B2 | 10/2003 | Yokota et al. |
| 6,772,195 | B1 | 8/2004 | Hatlelid et al. |
| 6,856,901 | B2 | 2/2005 | Han |
| 6,883,146 | B2 | 4/2005 | Prabhu et al. |
| 6,983,203 | B1 | 1/2006 | Wako |
| 6,995,778 | B2 | 2/2006 | Noble et al. |
| 6,996,783 | B2 | 2/2006 | Brown et al. |
| 7,054,478 | B2 | 5/2006 | Harman |
| 7,076,741 | B2 | 7/2006 | Miyaki |
| 7,336,260 | B2* | 2/2008 | Martin et al. .............. 345/169 |
| 7,343,046 | B2 | 3/2008 | Curry et al. |
| 7,523,405 | B2 | 4/2009 | Robertson et al. |
| 7,570,272 | B2 | 8/2009 | Dooley et al. |
| 7,573,487 | B1* | 8/2009 | Petersen .............. 345/629 |
| 8,149,249 | B1* | 4/2012 | Oplinger .............. 345/661 |
| 8,339,399 | B2 | 12/2012 | Snow |
| 8,560,228 | B2* | 10/2013 | Feldbauer .............. 701/426 |
| 2002/0065605 | A1 | 5/2002 | Yokota |
| 2002/0163547 | A1 | 11/2002 | Abramson et al. |
| 2003/0011601 | A1 | 1/2003 | Itoh et al. |
| 2003/0229441 | A1* | 12/2003 | Pechatnikov et al. ........ 701/201 |
| 2004/0243306 | A1 | 12/2004 | Han |
| 2004/0261037 | A1 | 12/2004 | Ording et al. |
| 2005/0107949 | A1 | 5/2005 | Yokota |
| 2005/0219268 | A1 | 10/2005 | Kyle |
| 2005/0251331 | A1 | 11/2005 | Kreft |
| 2005/0270311 | A1 | 12/2005 | Rasmussen et al. |
| 2006/0005114 | A1* | 1/2006 | Williamson et al. ........ 715/502 |
| 2006/0080032 | A1 | 4/2006 | Cooper |
| 2006/0184313 | A1 | 8/2006 | Butler |
| 2007/0050129 | A1 | 3/2007 | Salmre |
| 2008/0005674 | A1 | 1/2008 | Wattenberg et al. |
| 2008/0059889 | A1 | 3/2008 | Parker et al. |
| 2008/0086356 | A1 | 4/2008 | Glassman et al. |
| 2008/0281869 | A1 | 11/2008 | Liu et al. |
| 2009/0012953 | A1 | 1/2009 | Chu et al. |
| 2009/0024315 | A1 | 1/2009 | Scheibe |
| 2009/0055774 | A1 | 2/2009 | Joachim |
| 2009/0100363 | A1* | 4/2009 | Pegg et al. .............. 715/765 |
| 2009/0110302 | A1 | 4/2009 | Snow |
| 2009/0132511 | A1 | 5/2009 | Yang et al. |
| 2009/0313267 | A1* | 12/2009 | Girgensohn et al. ......... 707/100 |
| 2010/0023259 | A1 | 1/2010 | Krumm et al. |
| 2010/0088631 | A1 | 4/2010 | Schiller |
| 2010/0115407 | A1* | 5/2010 | Kim et al. .............. 715/708 |
| 2011/0010650 | A1 | 1/2011 | Hess et al. |
| 2011/0041088 | A1 | 2/2011 | Mason |
| 2011/0046881 | A1 | 2/2011 | Karaoguz |
| 2011/0161875 | A1 | 6/2011 | Kankainen |
| 2011/0173572 | A1 | 7/2011 | van Zwol et al. |
| 2011/0225541 | A1 | 9/2011 | Ramos |
| 2011/0225546 | A1 | 9/2011 | Ramos |
| 2011/0313649 | A1* | 12/2011 | Bales et al. .............. 701/200 |
| 2012/0017168 | A1* | 1/2012 | Mason et al. .............. 715/781 |
| 2012/0316782 | A1* | 12/2012 | Sartipi et al. .............. 701/455 |

OTHER PUBLICATIONS

"Non-Final Office Action", U.S. Appl. No. 12/720,503, (Jun. 6, 2013),17 pages.

"Non-Final Office Action", U.S. Appl. No. 12/720,548, (May 7, 2013),16 pages.

Fisher, et al., "Spatial Filters—Gaussian Smoothing", Retrieved from <http://homepages.inf.ed.ac.uk/rbf/HIPR2/gsmooth.htm> on May 30, 2013, (2003), 7 pages.

"Notice of Allowance", U.S. Appl. No. 11/930,367, (Sep. 19, 2012), 9 pages.

Burigat, et al., "Decluttering of Icons Based on Aggregation in Mobile Maps", Retrieved at <<http://bilder.buecher.de/zusatz/23/23169/23169025_lese_1.pdf>>, Retrieved Date: Sep. 15, 2011, pp. 21.

Beran, Bora, "Hydroseek: An Ontology-Aided Data Discovery System for Hydrologic", Retrieved at <<http://citeseerx.ist.psu.edu/viewdoc/download?doi=10.1.1.93.145&rep=rep1&type=pdf>>, Sep. 2007, pp. 156.

"ArcPad StreetMap: Street-Level Data, Geocoding, and Routing for Mobile Systems", http://www.infograph.com.jo/resources/product/ArcPad/arcpad-streetmap_mobilesystems.pdf, (Dec. 2003),14 pages.

"Auto-Highlight Areas of Any Map Image", Retrieved from: <http://www.webresourcesdepot.com/auto-highlight-areas-of-any-map-image/> on Feb. 3, 2010, (Feb. 12, 2008),2 pages.

"EveryBlock Seattle: Seattle Local News and Public Records", Retrieved from: <http://seattle.everyblock.com/> on Feb. 2, 2010, (2010),2 pages.

"Mashing Up Using Virtual Earth", http://serl.cs.colorado.edu/~dennis/cs7818f06/MashingUpUsingVirtualEarth.pdf, (Sep. 15, 2006),6 Pages.

"Non-Final Office Action", U.S. Appl. No. 11/930,367, (Mar. 1, 2012),25 pages.

"PCT Search Report and Written Opinion", Application No. PCT/US2011/026755, (Aug. 25, 2011),10 pages.

"VidaOne GPS Pocket PC UserÂ?s Guide", http://www.vidaone.com/download/VdaGPS.pdf, (Jan. 2007),22 Pages.

"What does OECD eXplorer enable you to do? An introduction to its main features", Available at <http://www.oecd.org/dataoecd/55/47/44084514.pdf>,(Jun. 29, 2009),pp. 1-33

"Working with Pushpin Layers", Retrieved from: http://msdn2.microsoft.com/en-us/library/aa972905.aspx on Aug. 21, 2007., 3 Pages.

Boutin, Francois et al., "Focus Dependent Multi-level Graph Clustering", In Proceedings of AVI 2004,(May 2004),pp. 167-170.

Crampton, Jeremy W., "Interactivity Types in Geographic Visualization", *Cartography and Geographic Information Science*, vol. 29, No. 2, Available at <http://www.geog.psu.edu/courses/geog421/private/Crampton%20galleys.pdf>,(Apr. 2002),pp. 1-15.

Khan, Azam "Spotlight: Directing Users' Attention on Large Displays", *CHI 2005, Papers: Enhancing Virtual Spaces and Large Displays*, Available at <http://portal.acm.org/citation.cfm?id=1054972.1055082>,(Apr. 2005),pp. 791-798.

Kleiweg, Peter et al., "Geographic Projection of Cluster Composites", *Diagrammatic Representation and Inference, Third International Conference, Diagrams 2004*, Cambridge, UK, Available at <http://www.let.rug.nl/~kleiweg/papers/kleiweg04.pdf>,(Mar. 2004),3 pages.

Mathewson, Tim et al., "Realtime Observation Monitoring and Analysis Network", *A National Joint Project Between Interagency Meteorologists and the University of Utah*, Available at <http://www.blm.gov/colorado/rmafwx/roman.pdf>,(2003),22 pages.

Mummidi, Lakshmi et al., "Discovering Points of Interest from Users' Map Annotations", *Reprint of version in GeoJournal 2008*, Available at <http://research.microsoft.com/en-us/um/people/jckrumm/Publications%202008/map%20annotationsl%20preprint.pdf>,(2008),pp. 1-25.

Popescu, Adrian et al., "Creating Visual Summaries for Geographic Regions", *Institut TELCOM Bretagne*, Available at <http://georama-project.labs.exalead.com/publication/popescu_kanellos_final.pdf>,(Apr. 6, 2009),6 pages.

(56) References Cited

OTHER PUBLICATIONS

Ramos, Gonzalo et al., "Tumble! Splat! Helping Users Access and Manipulate", *AVI 2006*,(May 2006),pp. 428-435.
"Final Office Action", U.S. Appl. No. 12/720,503, Dec. 24, 2013, 19 pages.
"Non-Final Office Action", U.S. Appl. No. 12/720,503, Mar. 28, 2014, 20 pages.
"Final Office Action", U.S. Appl. No. 12/720,503, Jan. 9, 2015, 21 pages.
"Non-Final Office Action", U.S. Appl. No. 12/720,548, Nov. 21, 2014, 18 pages.
"Foreign Office Action", CN Application No. 201180012983.5, Mar. 19, 2015, 12 pages.
"Foreign Office Action", CN Application No. 201180012983.5, 07/30214, 16 pages.
"Final Office Action", U.S. Appl. No. 12/720,548, Jul. 18, 2014, 21 pages.
Third Office Action mailed Sep. 28, 2015 from China Patent Application No. 201180012983.5, 13 pages.
Non-Final Office Action mailed on Jun. 5, 2008 from U.S. Appl. No. 11/280,635, 15 pages.
Examiner-Initiated Interview Summary mailed on Jul. 16, 2008 from U.S. Appl. No. 11/280,635, 4 pages.
Response filed on Jul. 22, 2008 to Non-Final Office Action mailed on Jun. 5, 2008 from U.S. Appl. No. 11/280,635, 9 pages.
Final Office Action mailed on Oct. 17, 2008 from U.S. Appl. No. 11/280,635, 11 pages.
Response filed on Nov. 24, 2008 to Final Office Action mailed on Oct. 17, 2008 from U.S. Appl. No. 11/280,635, 8 pages.
Notice of Allowance mailed on Dec. 10, 2008 from U.S. Appl. No. 11/280,635, 8 pages.
Response filed on Jul. 2, 2012 to Non-Final Office Action mailed on Mar. 1, 2012 from U.S. Appl. No. 11/930,367, 16 pages.
"Metaballs," Feb. 27, 2009, retrieved at <<http://en.wikipedia.org/wiki/Metaballs>> on Nov. 14, 2015, 2 pages.
Collins et al., "Bubble Sets: Revealing Set Relations with Isocontours over Existing Visualizations," Feb. 12, 2010, retrieved at <<http://www.cs.toronto.edu/~ccollins/research/bubblesets/index.html>> on Nov. 14, 2015, 2 pages.
Watanabe et al., "Bubble Clusters: An Interface for Manipulating Spatial Aggregation of Graphical Objects," Aug. 21, 2009, retrieved at <<http://www-ui.is.s.u-tokyo.ac.jp/~takeo/research/bubble/index.html<<on Nov. 14, 2015, 1 page.
Whitmore, Stephen, "Exploring Metaballs and Isosurfaces in 2D," Jun. 26, 2009, retrieved at <<http://www.gamedev.net/reference/programming/features/isometa2d/>>0 on Nov. 14, 2015, 3 pages.
Xu et al., "Active Contours, Deformable Models, and Gradient Vector Flow," Image Analysis and Communications Lab, Dec. 17, 2009, retrieved at <<http://iacl.ece.jhu.edu/projects/gvf/>> on Nov. 14, 2015, 7 pages.
Response filed Jun. 20, 2013 to Non-Final Office Action mailed on May 7, 2013 from U.S. Appl. No. 12/720,548, 19 pages.
Response filed Sep. 17, 2014 to Final Office Action mailed on Jul. 18, 2014 from U.S. Appl. No. 12/720,548, 21 pages.
Response filed Feb. 23, 2015 to Non-Final Office Action mailed on Nov. 21, 2014 from U.S. Appl. No. 12/720,548, 22 pages.
Final Office Action mailed on Nov. 6, 2015 from U.S. Appl. No. 12/720,548, 20 pages.
Response filed Aug. 13, 2013 to Non-Final Office Action mailed on Jun. 6, 2013 from U.S. Appl. No. 12/720,503, 15 pages.
Response filed Mar. 3, 2014 to Final Office Action mailed on Dec. 24, 2013 from U.S. Appl. No. 12/720,503, 15 pages.
Response filed May 8, 2014 to Non-Final Office Action mailed on Mar. 28, 2014 from U.S. Appl. No. 12/720,503, 16 pages.
Response filed Mar. 27, 2015 to Final Office Action mailed on Jan. 9, 2015 from U.S. Appl. No. 12/720,503, 18 pages.
Non-Final Office Action mailed on Sep. 24, 2015 from U.S. Appl. No. 12/720,503, 23 pages.
PCT International Preliminary Report on Patentability mailed on Sep. 11, 2012 from PCT Application No. PCT/US2011/026755, 6 pages.
Response filed Dec. 14, 2014 to First Office Action mailed on Jul. 30, 2014 from China Patent Application No. 201180012983.5, 16 pages.
Response filed May 29, 2015 to Second Office Action mailed on Mar. 19, 2015 from China Patent Application No. 201180012983.5, 11 pages.
Response filed Dec. 14, 2015 to the Third Office Action mailed Sep. 28, 2015 from China Patent Application No. 201180012983.5, pages.
Decision on Rejection mailed Jan. 7, 2016 from China Patent Application No. 201180012983.5, 10 pages.
Applicant Initiated Interview Summary mailed Jan. 29, 2016 from U.S. Appl. No. 12/720,548, 4 pages.
Applicant Initiated Interview Summary mailed Feb. 1, 2016 from U.S. Appl. No. 12/720,503, 3 pages.
Response filed Jan. 22, 2016 to Non-Final Office Action mailed Sep. 24, 2015 from U.S. Appl. No. 12/720,503, 13 pages.
Response filed Aug. 16, 2016 to the Non-Final Office Action mailed May 19, 2016 from U.S. Appl. No. 12/720,548, 13 pages.
Response and After Final Consideration Pilot Program Request filed Jul. 13, 2016 to the Final Office Action mailed Apr. 8, 2016 from U.S. Appl. No. 12/720,503, 15 pages.
Advisory Action, Applicant-Initiated Interview Summary and After Final Consideration Program Decision mailed Aug. 12, 2016 from U.S. Appl. No. 12/720,503, 6 pages.
Final Office Action mailed Apr. 8, 2016 from U.S. Appl. No. 12/720,503, 50 pages.
Response filed Apr. 20, 2016 to the Decision on Rejection mailed Jan. 7, 2016 from China Patent Application No. 201180012983.5, 9 pages.
Non-Final Office Action mailed May 19, 2016 from U.S. Appl. No. 12/720,548, 46 pages.
Applicant-Initiated Interview Summary mailed Jun. 6, 2016 from U.S. Appl. No. 12/720,503, 3 pages.
Notification of Reexamination mailed Aug. 31, 2016 from Chinese Patent Application No. 2011800129835, 12 pages.
Final Office Action mailed Dec. 2, 2016 from U.S. Appl. No. 12/720,548, 38 pages.

\* cited by examiner

INTERACTIVE VISUAL REPRESENTATION OF POINTS OF INTEREST DATA

BACKGROUND

Geo-located data is growing in quantities at a rapid rate. Examples of such data include yellow page listings for business, demographic data released by government organizations, encyclopedic data in digital repositories, people's status reports as generated from their GPS-enabled mobile devices, annotated imagery from various repositories, and geo-located entities extracted from hyperlocal blog posts, to name just a few.

A traditional way of visually representing this geo-located data is to render small visual entities on the surface of a map of some type. These entities often take the shape of a pin, thumbtack, small flag, colored dot or similar object. This is a common practice in the map sections of various search engines. This type visual representation, however, suffers from two main problems.

First, as the number of points-of-interest (POI) on a map increases, so too does the number of occluding entities. This occlusion makes entities hard or impossible to be reached, as by being touched, clicked, or otherwise selected by users. Second, as a user manipulates the zoom level of a map, the potential multitude of rendered POIs occlude the map surface in such a way that clutters and make illegible any information, such as geographical features, the map may contain.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide a visual language that enables a continuous representation, at different levels of detail, that range from a single discrete point to multiple points that are near each other or clustered together to unify the look-and-feel of represented elements and provide interactive consistency across various map properties and platforms.

Various embodiments utilize a unified interactive visual design that achieves a number of objectives. The visual design expresses sets of geo-located points-of-interest (POI) on a map as discrete, selectable elements at high levels of detail (LOD). The design naturally uses the graphics properties of the POIs to construct and display clusters of overlapping POIs and can express sets of POIs on a map as heat-map-like elements at low LOD. An expansion de-clustering mechanism preserves spatial relationships of elements when zooming does not suffice for POI disambiguation. The visual design can be utilized in connection with different form-factor devices, e.g., phone, slate, desktop and the like, as well as with different input modalities such as touch, pointing, gesturing, and the like.

BRIEF DESCRIPTION OF THE DRAWINGS

The same numbers are used throughout the drawings to reference like features.

DETAILED DESCRIPTION

Overview

Various embodiments provide a visual language that enables a continuous representation, at different levels of detail, that range from a single discrete point to multiple points that are near each other or clustered together to unify the look-and-feel of represented elements and provide interactive consistency across various map properties and platforms.

Various embodiments utilize a unified interactive visual design that achieves a number of objectives. The visual design expresses sets of geo-located points-of-interest (POI) on a map as discrete, selectable elements at high levels of detail (LOD). The design naturally uses the graphics properties of the POIs to construct and display cluster of overlapping POIs and can express sets of POIs on a map as heat-map-like elements at low LOD. An expansion de-clustering mechanism preserves spatial relationships of elements when zooming does not suffice for POI disambiguation. The visual design can be utilized in connection with different form-factor devices, e.g., phone, slate, desktop and the like, as well as with different input modalities such as touch, pointing, gesturing, and the like.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
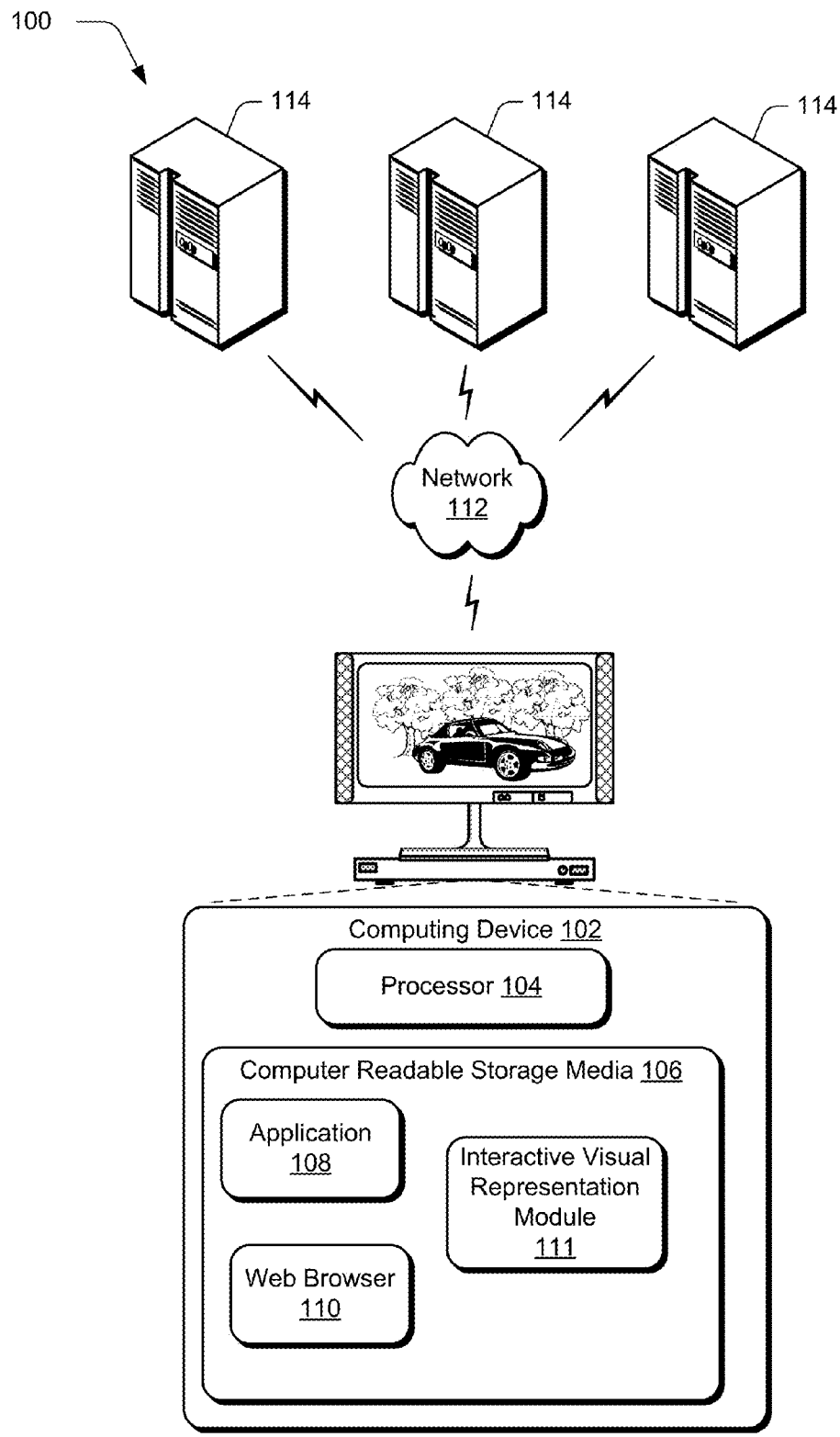
FIG. 1 illustrates an example operating environment in accordance with one or more embodiments.

FIG. 1 illustrates an operating environment in accordance with one or more embodiments, generally at 100. Environment 100 includes a computing device 102 in the form of a local client machine having one or more processors 104, one or more computer-readable storage media 106, one or more applications 108 that resides on the computer-readable storage media and which are executable by the processor 104. Computing device 102 also includes a web browser 110 and an interactive visual representation module 111 that operates as described below. Module 111 can reside as a separate component that is utilized by applications 108 and web browser 110. Alternately, module 111 can be integrated with applications 108 and/or web browser 110.

Computing device 102 can be embodied as any suitable computing device such as, by way of example and not limitation, a desktop computer, a portable computer, a handheld computer such as a personal digital assistant (PDA), mobile phone, television, tablet computer, and the like. One of a variety of different examples of a computing device 102 is shown and described below in FIGS. 21 and 22.

Applications 108 can include any suitable type of applications. The web browser 110 is configured to navigate via the network 112. Although the network 112 is illustrated as the Internet, the network may assume a wide variety of configurations. For example, the network 112 may include a wide area network (WAN), a local area network (LAN), a wireless network, a public telephone network, an intranet, and so on. Further, although a single network 112 is shown, the network 112 may be configured to include multiple networks.

The browser, for instance, may be configured to navigate via the network 112 to interact with content available from one or more web servers 114 as well as communicate data to the one or more web servers 114, e.g., perform downloads and uploads. The web servers 114 may be configured to provide one or more services that are accessible via the network 112. Examples of such services include map services, email, web pages, photo sharing sites, social networks, content sharing services, media streaming services, data displaying services and so on.

One or more of the applications 108 may also be configured to access the network 112, e.g., directly themselves and/or through the browser. For example, one or more of the applications 108 may be configured to communicate messages, such as email, instant messages, and so on. In additional examples, an application 108, for instance, may be configured to access a social network, obtain weather updates, interact with a bookstore service implemented by one or more of the web servers 114, support word processing, provide spreadsheet functionality, support creation and output of presentations, and so on.

Thus, applications 108 may also be configured for a variety of functionality that may involve direct or indirect network 112 access. For instance, the applications 108 may include configuration settings and other data that may be leveraged locally by the application 108 as well as synchronized with applications that are executed on another computing device. In this way, these settings may be shared by the devices. A variety of other instances are also contemplated. Thus, the computing device 102 may interact with content in a variety of ways from a variety of different sources.

Interactive visual representation module 111 is representative of functionality that enables a continuous representation of visual elements, at different levels of detail, that range from a single discrete point, such as that which would appear on a map that includes geographic locations or other representations of data that may not necessarily be geographic in nature, to multiple points that are near each other or clustered together to unify the look-and-feel of represented elements and provide interactive consistency across various map properties and platforms. Module 111 is configured to utilize a unified interactive visual design that achieves a number of objectives. The visual design expresses sets of geo-located points-of-interest (POI) on a map as discrete, selectable elements at high levels of detail (LOD). The design naturally uses the graphics properties of the POIs to construct and display cluster of overlapping POIs and can express sets of POIs on a map as heat-map-like elements at low LOD. An expansion de-clustering mechanism preserves spatial relationships of elements when zooming does not suffice for POI disambiguation. The visual design can be utilized in connection with different form-factor devices, e.g., phone, slate, desktop and the like, as well as with different input modalities such as touch, pointing, gesturing, and the like, as will become apparent below.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the techniques described below are platform-independent, meaning that the techniques may be implemented on a variety of commercial computing platforms having a variety of processors.

For example, the computing device 102 may also include an entity (e.g., software) that causes hardware or virtual machines of the computing device 102 to perform operations, e.g., processors, functional blocks, and so on. For example, the computing device 102 may include a computer-readable medium that may be configured to maintain instructions that cause the computing device, and more particularly the operating system and associated hardware of the computing device 102 to perform operations. Thus, the instructions function to configure the operating system and associated hardware to perform the operations and in this way result in transformation of the operating system and associated hardware to perform functions. The instructions may be provided by the computer-readable medium to the computing device 102 through a variety of different configurations.

One such configuration of a computer-readable medium is signal bearing medium and thus is configured to transmit the instructions (e.g., as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Having described an example environment in which the techniques described herein may operate, consider now a discussion of some example embodiments that can utilize the principles described herein.

Example Embodiments

The description below first introduces the notion of a point-of-interest" or "POI". Following this, example rendering rules are described that utilize POIs in accordance with one or more embodiments. Next, processing associated with POI clusters is described.

Example Points-Of-Interest (POIs) and Rendering Rules

In the discussion that follows, the notion of a point-of-interest (POI) is first introduced. POIs are described in terms of a visual language that addresses a set of tasks. A first task pertains to the presence of an element in the world the location of which a user wishes to ascertain, e.g., an address. A second task pertains to a result set of a collection of elements that a user wishes to reduce to a single element or subset of elements, such as nearby restaurants or banks A third task pertains to a result set that provides a signal or other information about a particular area (e.g., crime rate in a city), as will become apparent below.

When used in concert, these tasks cover a wide range of scenarios. For example, there is a natural progression in which the third task can lead to the second task which, in turn, can lead to the first task, e.g., a visualization of crime rate around a user's home.

In the described embodiments, each task is strongly connected to a set of levels of detail or LODs. The LODs, which span a spectrum of high, medium and low are associated with a user's level of engagement, as will become apparent below.

Following this rationale, POIs represent a flow from the specific, at high LODs, to a more generic heat-map-like representation at low LODs. In the illustrated and described embodiment, the POI interactive visualization system is based on three basic principles. First, POIs include at least two separate layers: a core layer (foreground) and a casing layer (background). Optionally, other layers can be included such as, by way of example and not limitation, a leads layer for lead lines and/or a content layer for labels, icons and the like. Second, POIs' core and casing sizes e.g., diameters (in the event that circles are utilized) are a function of a map's current LOD. It is to be noted that geometries other than circles can be utilized to represent points of interest without departing from the spirit and scope of the claimed subject matter. Third, a POI's casing (background) opacity (transparency) is a function of a map's current LOD.

Figure 2:
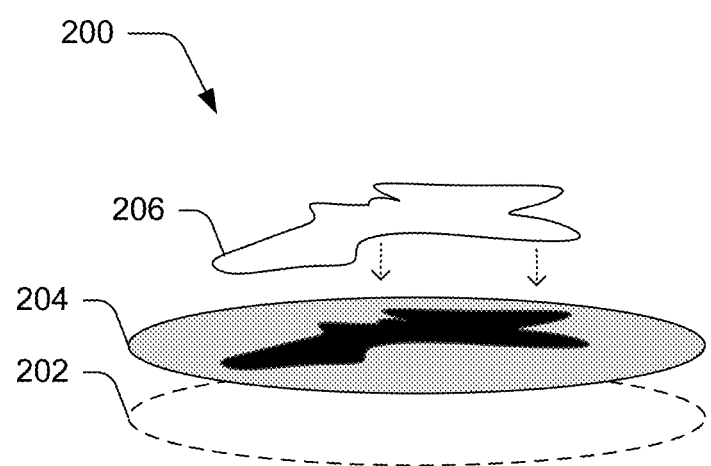
FIG. 2 illustrates an example point of interest in accordance with one or more embodiments.

As an example, consider FIG. 2 which illustrates, in an isometric view, an example POI in accordance with one or more embodiments generally at 200. In this example, POI includes a casing layer 202, a core layer 204 and an optional content layer 206 that is visually projected onto the core layer 204 as indicated by the shadow.

In operation, at a basic level, the casing layer 202 and the core layer 204 are utilized to visually aggregate POIs. The casing layer 202 and the core layer 204 are visual attributes of the POI, whose size and style are a function of the current LOD, as will become apparent below.

In one or more embodiments, in a mapping context, the casing layer 202 utilizes an ambient color tone that reflects the color of a base map that a user sees and which makes up a land mass. This makes it essentially invisible over a land mass for reasons that include facilitating a visual offset from other elements that appear on the base map, such as roads, business labels, landmarks, and the like. That ambient color tone of the casing layer 202 ensures that the associated POI is visually offset from other map elements or features to enhance legibility.

In the illustrated and described embodiment, the casing layer 202 color-inverts when a POI is selected in an aerial or bird's eye view, which constitutes a photo-realistic layer of the area.

In the illustrated and described embodiment, the core layer 204 represents the POI's shade. The color of the core layer 204 is selected as a saturated hue that is selected to contrast with the base map in an effort to visually contrast with the canvas on which the map appears and is representative of a business or any other element that is called out as a POI.

The content layer 206 can be utilized to include text or an icon to represent a property of an associated element that might be represented on a map, such as in a list to the side of the map.

In operation, as a user zooms out on a POI, the POI gets smaller and does not occlude what the user may actually be looking for. Accordingly, in maps that have a lot of density, as a user zooms out, they are still able to read the labels underneath the POI reasonably well.

Figure 3A:
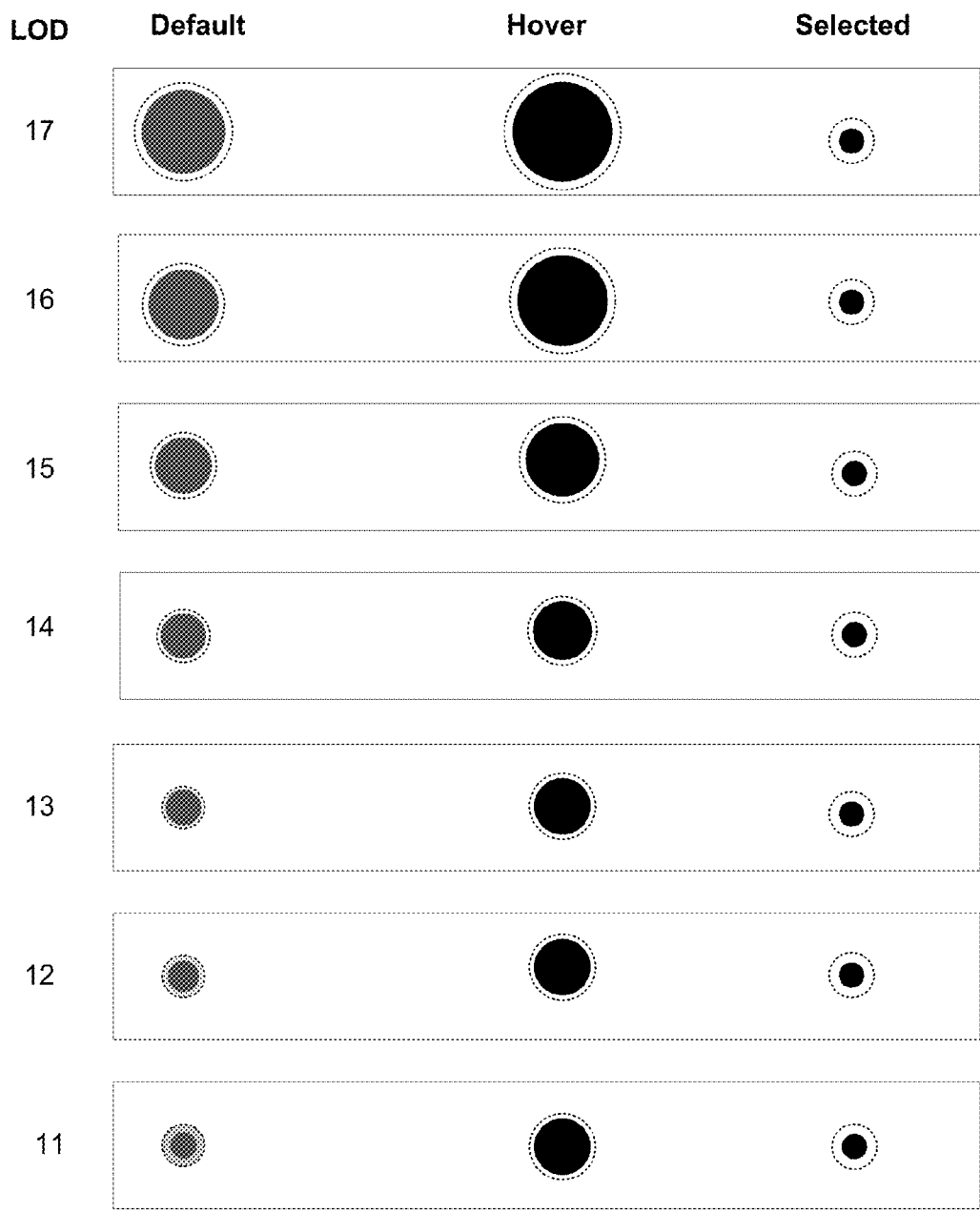
FIGS. 3a and 3b illustrate example points of interest in various states in accordance with one or more embodiments.
Figure 3B:
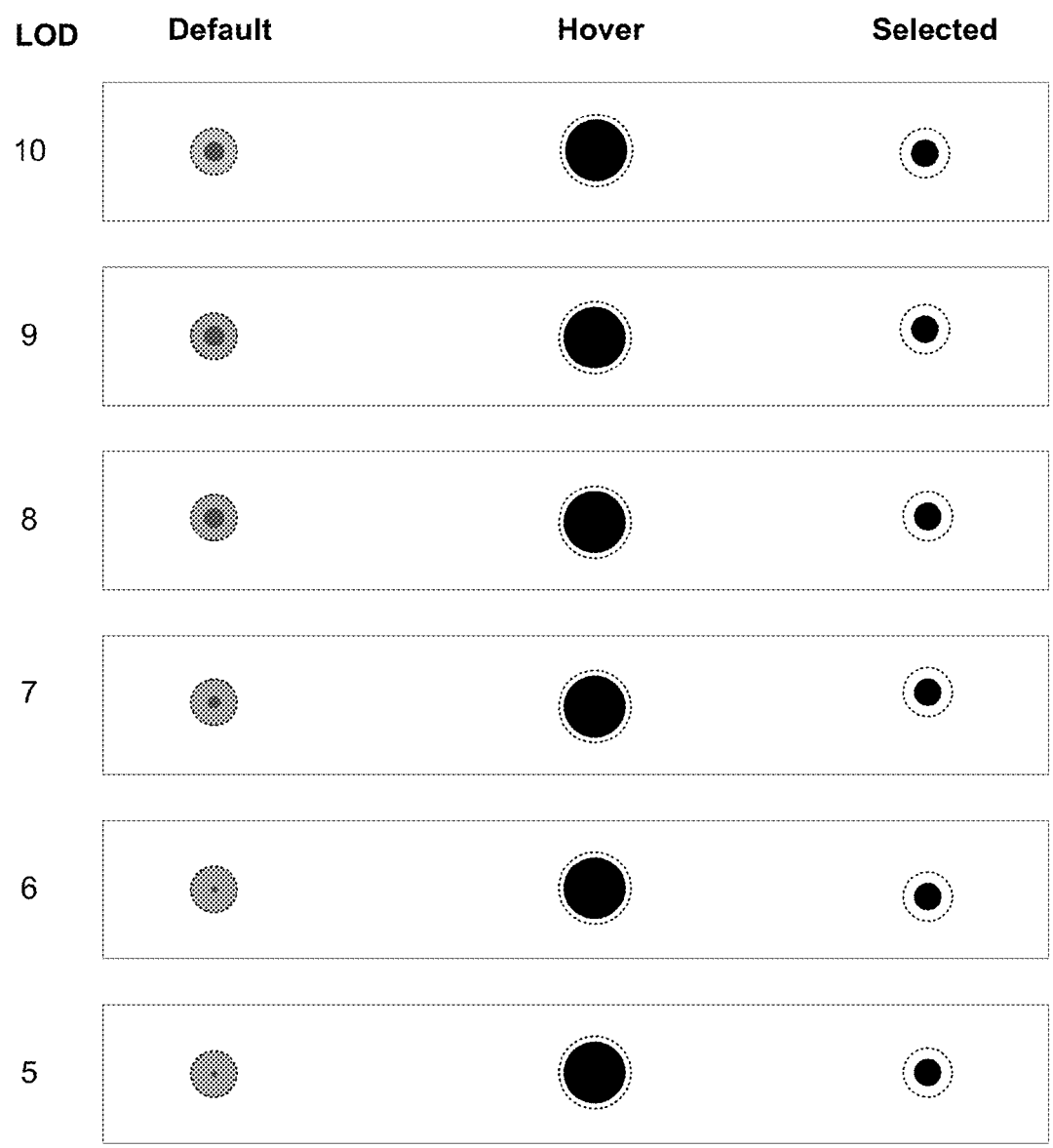

As an example, consider FIGS. 3a and 3b in combination with the table just below. The table and figures represent a matrix of how POIs are coded and displayed as one zooms out from a high level of detail (LOD), such as LOD 17, to a low level of detail, such as LOD 5. The table describes one possible set of rules that dictate or describe how a POI's size and state changes at different levels of detail.

| Level of Detail | Hover | Selected |
| --- | --- | --- |
| 17<br>fill: #009FEF, 19px<br>Stroke: #F4F1EE, 2.5px<br>Stroke alpha: 100% | fill: #000000, 24px<br>Stroke: #F4F1EE, 2.5px<br>Stroke alpha: 100% | fill: #000000, 7px<br>Stroke: #F4F1EE, 3.5px<br>Stroke alpha: 100% |
| 16<br>fill: #009FEF, 17px<br>Stroke: #F4F1EE, 2.5px<br>Stroke alpha: 100% | fill: #000000, 22px<br>Stroke: #F4F1EE, 2.5px<br>Stroke alpha: 100% | fill: #000000, 7px<br>Stroke: #F4F1EE, 3.5px<br>Stroke alpha: 100% |
| 15<br>fill: #009FEF, 15px<br>Stroke: #F4F1EE, 2.5px<br>Stroke alpha: 100% | fill: #000000, 20px<br>Stroke: #F4F1EE, 2.5px<br>Stroke alpha: 100% | fill: #000000, 7px<br>Stroke: #F4F1EE, 3.5px<br>Stroke alpha: 100% |
| 14<br>fill: #009FEF, 12px<br>Stroke: #F4F1EE, 2.5px<br>Stroke alpha: 100% | fill: #000000, 17px<br>Stroke: #F4F1EE, 2.5px<br>Stroke alpha: 100% | fill: #000000, 7px<br>Stroke: #F4F1EE, 3.5px<br>Stroke alpha: 100% |
| 13<br>fill: #009FEF, 8px<br>Stroke: #F4F1EE, 2.5px<br>Stroke alpha: 83% | fill: #000000, 8px<br>Stroke: #F4F1EE, 2.5px<br>Stroke alpha: 83% | fill: #000000, 7px<br>Stroke: #F4F1EE, 3.5px<br>Stroke alpha: 100% |
| 12<br>fill: #009FEF, 7px<br>Stroke: #F4F1EE, 3.5px<br>Stroke alpha: 65% | fill: #000000, 8px<br>Stroke: #F4F1EE, 2.5px<br>Stroke alpha: 83% | fill: #000000, 7px<br>Stroke: #F4F1EE, 3.5px<br>Stroke alpha: 100% |
| 11<br>fill: #009FEF, 5px<br>Stroke: #AFD8FF, 4.5px<br>Stroke alpha: 40% | fill: #000000, 8px<br>Stroke: #F4F1EE, 2.5px<br>Stroke alpha: 83% | fill: #000000, 7px<br>Stroke: #F4F1EE, 3.5px<br>Stroke alpha: 100% |
| 10<br>fill: #009FEF, 3px<br>Stroke: #AFD8FF, 5.5px<br>Stroke alpha: 20% | fill: #000000, 8px<br>Stroke: #F4F1EE, 2.5px<br>Stroke alpha: 83% | fill: #000000, 7px<br>Stroke: #F4F1EE, 3.5px<br>Stroke alpha: 100% |
| 9<br>fill: #009FEF, 3px<br>Stroke: #7DC0FF, 5.5px<br>Stroke alpha: 20% | fill: #000000, 8px<br>Stroke: #F4F1EE, 2.5px<br>Stroke alpha: 83% | fill: #000000, 7px<br>Stroke: #F4F1EE, 3.5px<br>Stroke alpha: 100% |
| 8<br>fill: #009FEF, 3px | fill: #000000, 8px<br>Stroke: #F4F1EE, | fill: #000000, 7px<br>Stroke: #F4F1EE, 3.5px |

-continued

| Level of Detail | Hover | Selected |
| --- | --- | --- |
| Stroke: #41A3FF, 5.5px | 2.5px | Stroke alpha: 100% |
| Stroke alpha: 20% | Stroke alpha: 83% | |
| 7 | fill: #000000, 8px | fill: #000000, 7px |
| fill: #009FEF, 2px | Stroke: #F4F1EE, | Stroke: #F4F1EE, 3.5px |
| Stroke: #0084FF, 6px | 2.5px | Stroke alpha: 100% |
| Stroke alpha: 20% | Stroke alpha: 83% | |
| 6 | fill: #000000, 8px | fill: #000000, 7px |
| fill: #009FEF, 1px | Stroke: #F4F1EE, | Stroke: #F4F1EE, 3.5px |
| Stroke: #0084FF, 2.5px | 2.5px | Stroke alpha: 100% |
| Stroke alpha: 20% | Stroke alpha: 83% | |
| 5 | fill: #000000, 8px | fill: #000000, 7px |
| fill: #009FEF, 1px | Stroke: #F4F1EE, | Stroke: #F4F1EE, 3.5px |
| Stroke: #0884FF, 6.5px | 2.5px | Stroke alpha: 100% |
| Stroke alpha: 20% | Stroke alpha: 83% | |

The table just above has three columns a first of which corresponds to a level of detail (LOD) and values associated with fill, stroke, and stroke alpha at a default state, a second which corresponds to a hover state at a corresponding level of detail along with values associated with fill, stroke, and stroke alpha in the hover state, and a third of which corresponds to a selected state at a corresponding level of detail along with values associated with fill, stroke, and stroke alpha. This table and its corresponding rows and columns map to a corresponding level of detail (LOD) visually depicted in FIGS. 3a and 3b.

In general, as one zooms out from higher levels of detail to lower levels of detail, the casing layer 202 incrementally changes from the ambient tone to a saturated blue hue over the levels of detail. As perhaps best illustrated visually in FIGS. 3a and 3b, at different levels of detail the POIs exhibit different visual styles. The columns designated "hover" and "selected" describe different visual properties that are exhibited as a user interacts with a particular POI. When a map is rendered at a particular level of detail responsive to, for example, a search, elements are represented visually by the POIs illustrated in FIGS. 3a and 3b, whose values are represented in the table above. When a hover action is detected or an element is selected, the POI is rendered in a manner indicated in the corresponding column designated "hover" and "selected" respectively. For example, when a user hovers over a particular POI, it swells slightly in size to provide feedback to the user. When a POI is selected, as by being clicked or touch-selected, it shrinks in size, as indicated in the corresponding "selected" column. This is done, among other reasons, because a pop-up menu item can be presented, as described below, to correspond to a selected element and provide additional information about a particular selected element. Reducing the POI in size responsive to a user selection results in less occlusion over the map itself.

Figure 4:
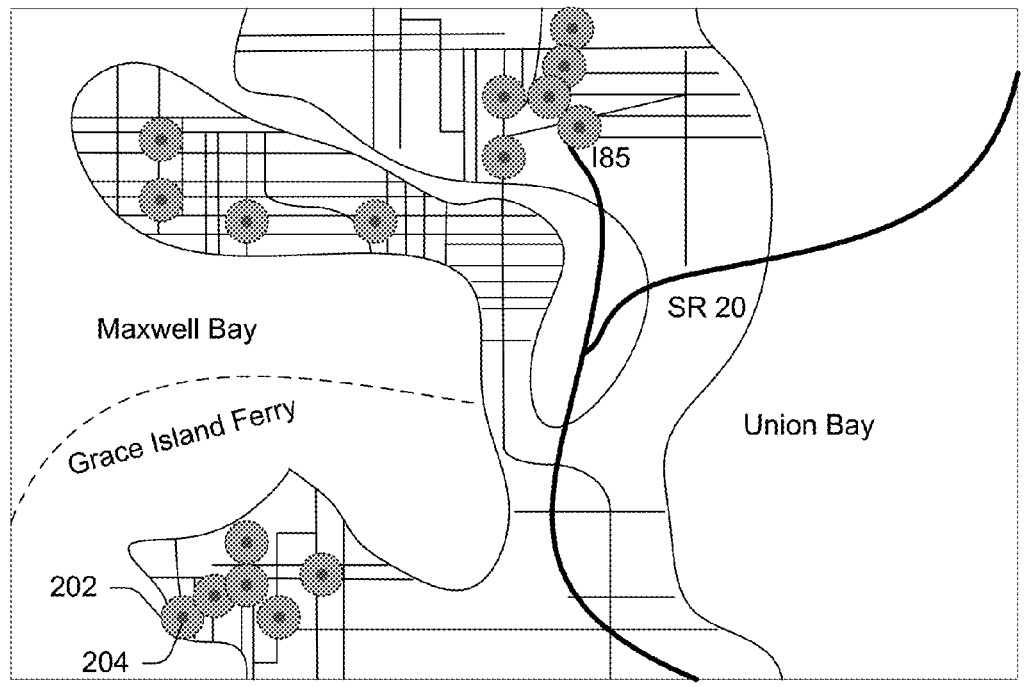
FIG. 4 illustrates a map in accordance with one or more embodiments.
Figure 4:
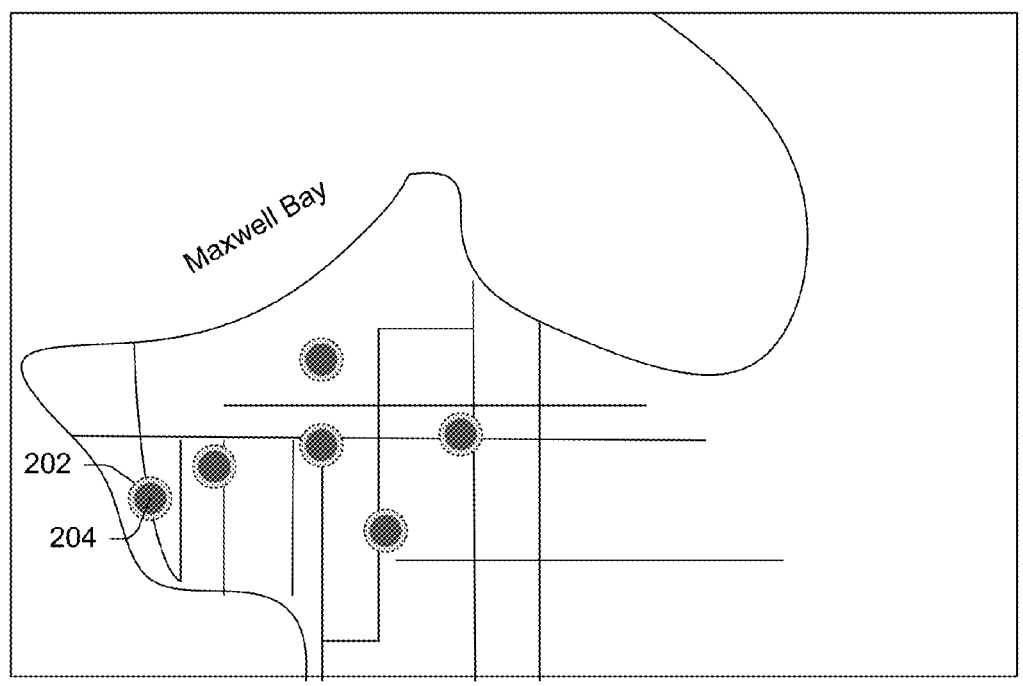

FIG. 4 illustrates an example map at two different levels of detail. The top-most map shows a number of POIs that are populated on the map at a first level of detail. The bottom-most map shows a zoomed version of a portion of the top-most map at a second, different (higher) level of detail. In this example, the overall POI as represented by the casing layer 202 remains essentially the same size. However, note that while the casing layer 202 associated with a particular point of interest remains essentially the same size, the core layer 204 changes in size. That is, the point that the core layer 204 marks in the foreground is modified as between the different levels of detail. In the top-most map, the core layer 204 is represented within the casing layer 202 as a small dot. In the bottom-most map, which has been zoomed, the core layer 204 is somewhat larger yet the casing layer 202 remains essentially the same size.

Example POI Clusters

When POIs are so close that they overlap, they can aggregate in clusters. The top-most map in FIG. 4 shows one such cluster near the bottom left hand side. Clusters can be even denser than shown in the figure. For example, office buildings may have several POIs that are to be populated on a map. Yet, when the POIs are drawn on a map, they are very tightly packed and in some instance overlay each other. As such, users cannot typically select individual POIs directly when they are part of a cluster. In one or more embodiments, users can select an individual POI that is part of a cluster by first zooming into the map. This can cause a separation of POIs on the map's surface, which then permits a user to select a POI as it breaks away from the cluster. The bottom-most map in FIG. 4 illustrates POIs that have been de-clustered in response to a zoom operation. The user can now, whether through an input device or touch selection, select a particular POI.

In the illustrated and described embodiments, zooming can be performed in different ways. For example, a map can be zoomed using a map's navigation controls, e.g., zoom controls, mouse scroll wheel, and the like. Alternately or additionally, by selecting a cluster, the selection action triggers a zoom-in operation that centers and scales the map appropriately to attempt to de-cluster clusters of POIs.

Figure 5:
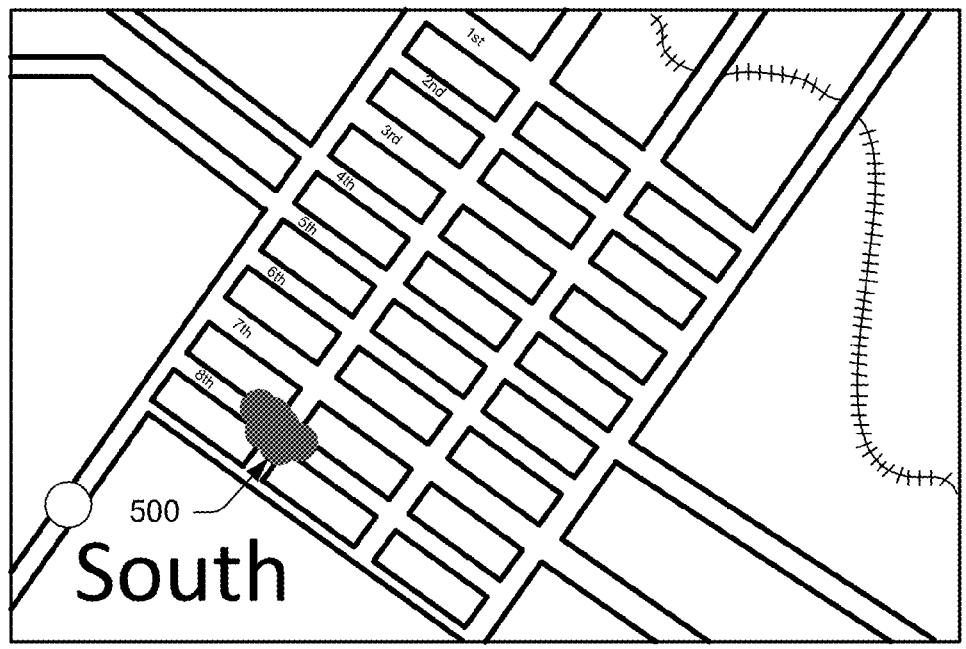
FIG. 5 illustrates a map in accordance with one or more embodiments.
Figure 5:
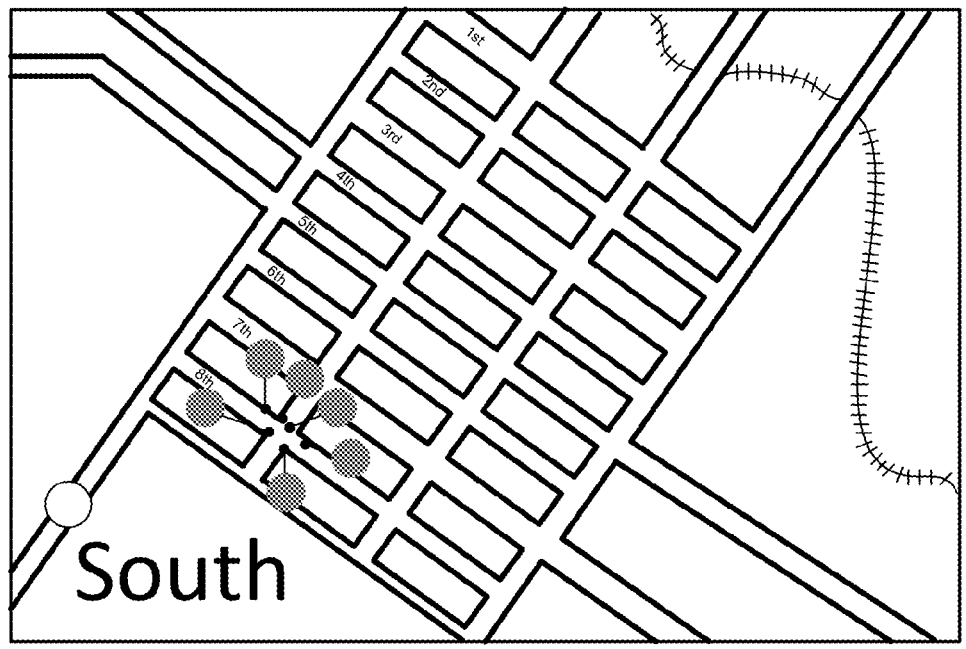
Figure 6:
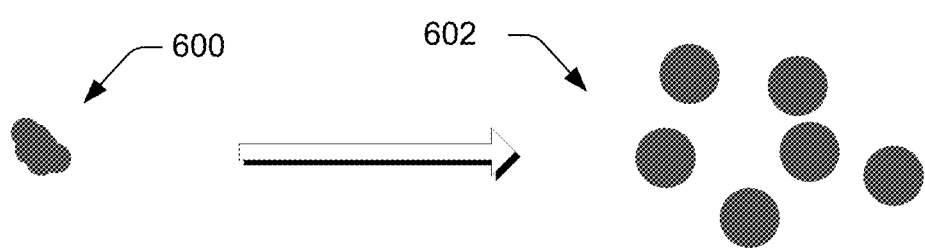
FIG. 6 illustrates points of interest being de-clustered in accordance with one or more embodiments.

De-clustering techniques can vary depending on the number of POIs in a cluster and the level of detail (LOD). As an example, consider FIG. 5 which illustrates a map at two different states. The top-most map shows a cluster 500 that includes a number of different POIs. In one or more embodiments, at a particular level of detail (LOD) and number of POIs in a cluster, rather than rendering the cluster to have overlapping POIs, the cluster is rendered in a disambiguated manner in which overlapping POIs are spread out and connected to their true location using lead lines as shown in the bottom-most map. Disambiguation can occur on an initial rendering of the POIs or automatically when a map is zoomed or responsive to sensing a selection of a particular cluster. For example, when a map is zoomed out at an LOD of 8 in a manner that presents a cluster, selecting the cluster, as through an input device or by touch-selection, presents an ambiguity as to which particular POI a user has selected. Once detecting this ambiguity, the system can automatically zoom to an appropriate level to disambiguate the cluster and present the cluster as shown in the bottom-most map of FIG. 5. Alternately, disambiguation can occur without necessarily utilizing the lead line approach illustrated in FIG. 4. For example, and as diagrammatically indicated in FIG. 6, a cluster is shown at 600 to include overlapping POIs at a first level of detail. Upon zooming the map or responsive to sensing a selection of the cluster, the individual POIs can be separated, as shown at 602, to individually represent the POIs.

Any suitable threshold can be utilized for defining LODs and/or numbers of POIs for which to perform automatic disambiguation. In this manner, once disambiguated, a user can select individual POIs easily using either an input device or by means of touch-selection.

Figure 7:
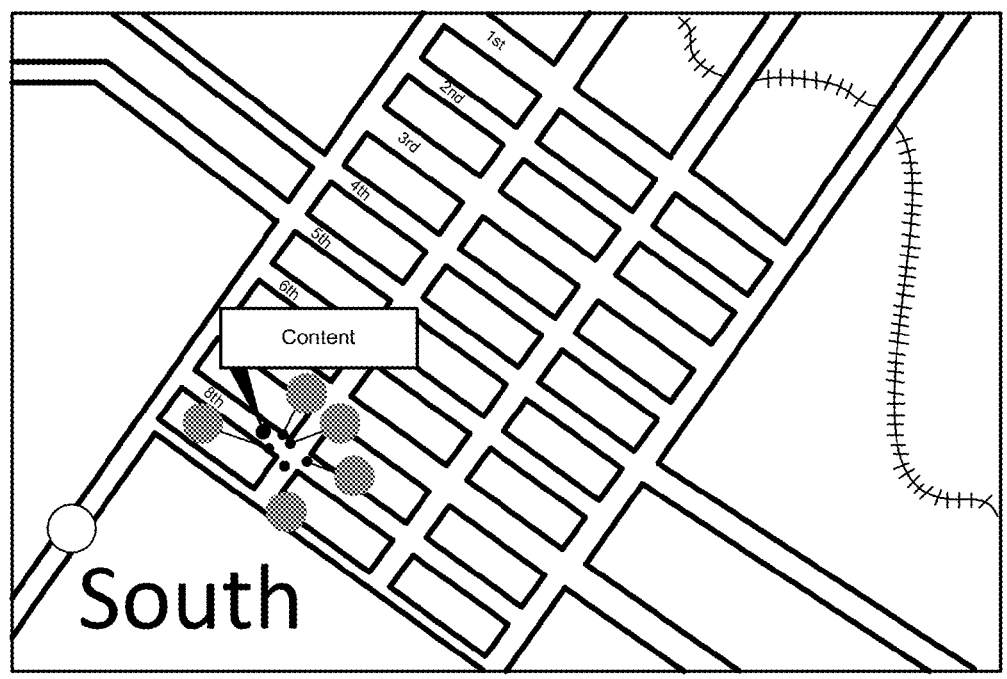
FIG. 7 illustrates a map in accordance with one or more embodiments.

FIG. 7 illustrates a map in which an individual POI of a disambiguated cluster has been selected by a user as indicated by the black dot that appears by itself. In one or more embodiments, once an individual POI has been selected by a user, a visual affordance, such as a pop-up menu here containing the term "content", can be presented to provide the user with additional information about their selection.

Figure 8:
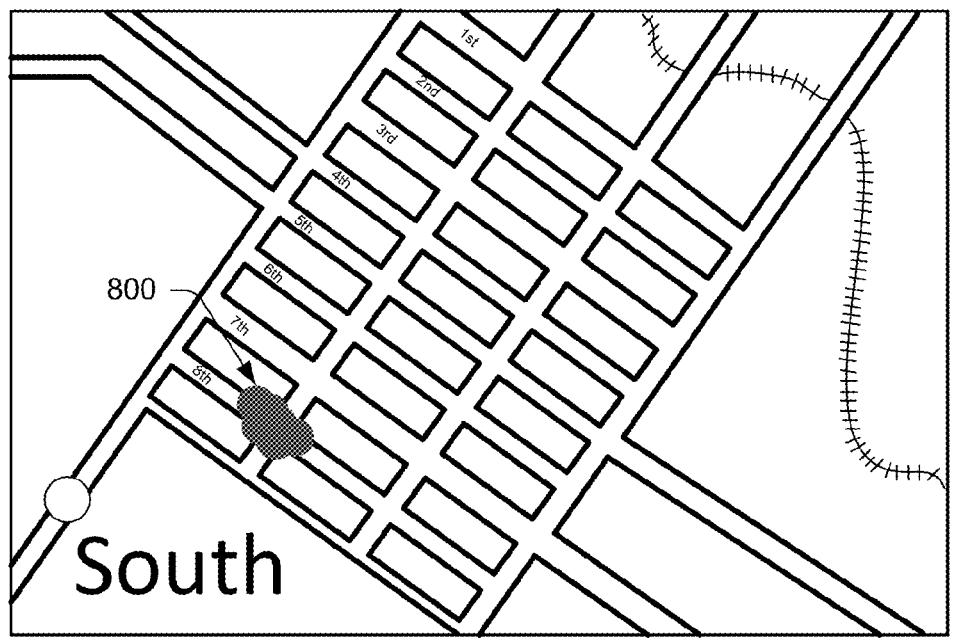
FIG. 8 illustrates a map in accordance with one or more embodiments.
Figure 8:
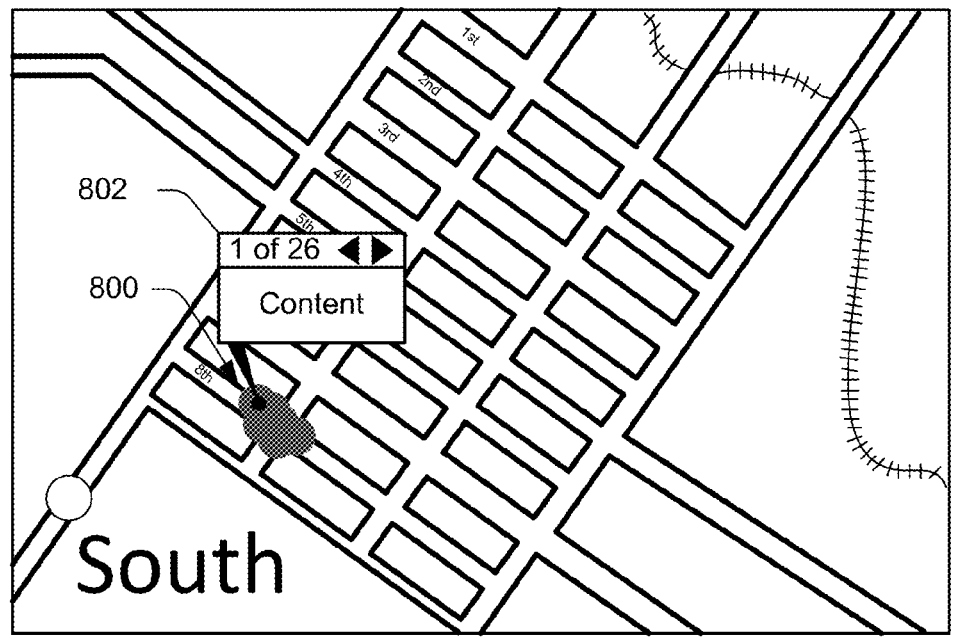

In some instances, POIs are clustered so densely that regardless of the zoom level, occlusion as among POIs is still going to occur. For example, such a cluster may represent an office building or a shopping mall in which a large number of densely packed POIs appear. Such is represented in FIG. 8. There, the top-most map illustrates a cluster of POIs generally at 800. Assume in this example, that the number of POIs in the cluster is large enough that a zoom operation will not disambiguate the individual POIs. In this case, a visual affordance 802 is presented which includes a pop-up menu in which content can be provided for an associated POI. In addition, the visual affordance includes a navigation instrumentality in the form of forward and backward buttons and a count of the POIs. In this instance, the user has selected the first of 26 POIs. Content associated with their selection can be displayed in visual affordance 802. By navigating through the POIs using the forward and backward buttons, the user can cycle through each POI and, correspondingly, receive information about each individual POI.

Figure 9:
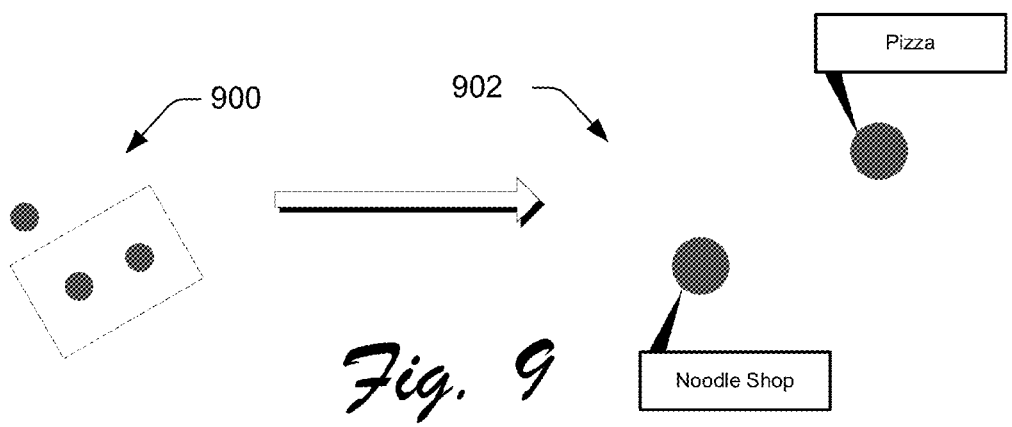
FIG. 9 illustrates points of interest rendered in accordance with one or more embodiments.

In one or more embodiments, as a user zooms to a high level of detail, individual POIs can be rendered to include a visual affordance in the form of a summary card. As an example, consider FIG. 9. There, a collection of POIs at a low level of detail is shown generally at 900. Assume that a user conducts the zoom operation to zoom in on the two POIs shown in the dashed box. The resulting zoom operation, once performed is represented generally at 902. In this instance, each individual POI includes a summary card which provides additional information about the POI. In this instance, one POI corresponds to a pizza shop, while another POI corresponds to a noodle shop.

Figure 10:
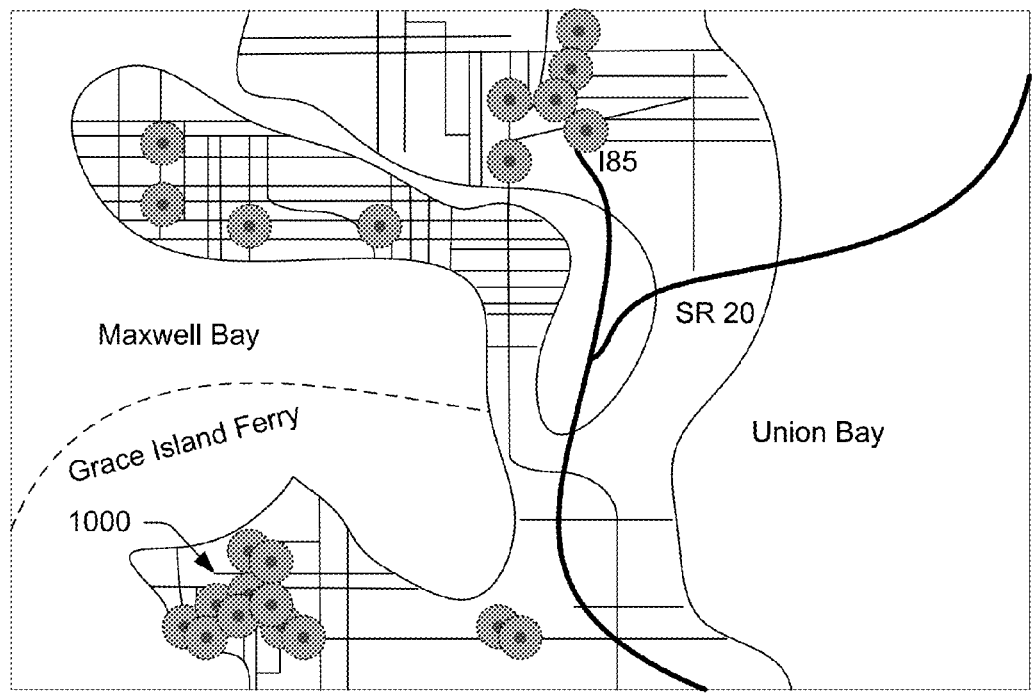
FIG. 10 illustrates a map in accordance with one or more embodiments.
Figure 10:
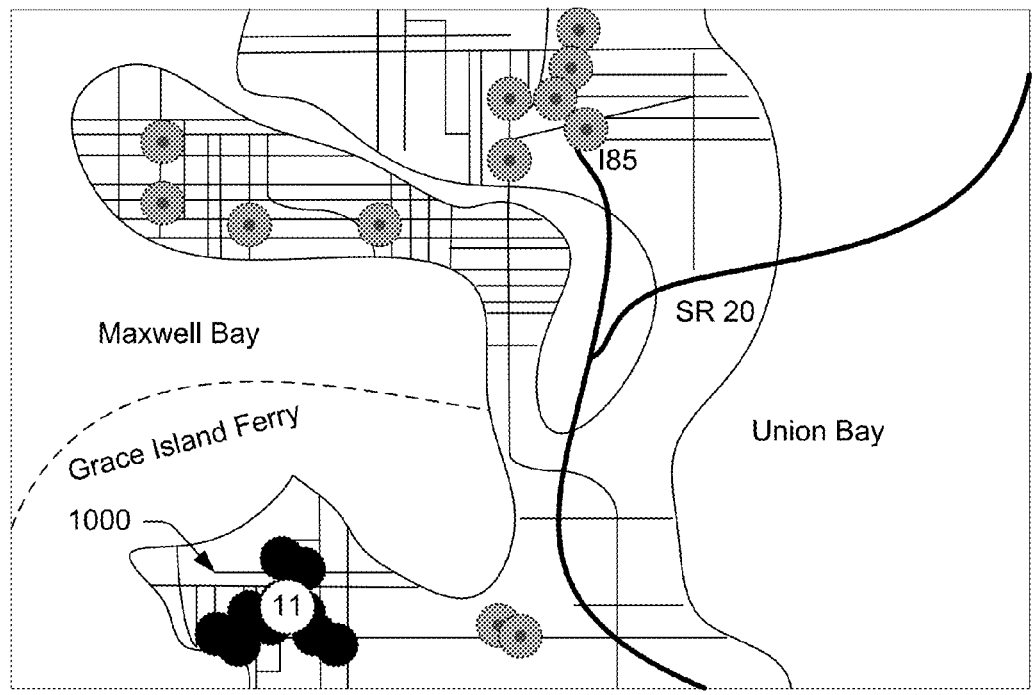
Figure 11:
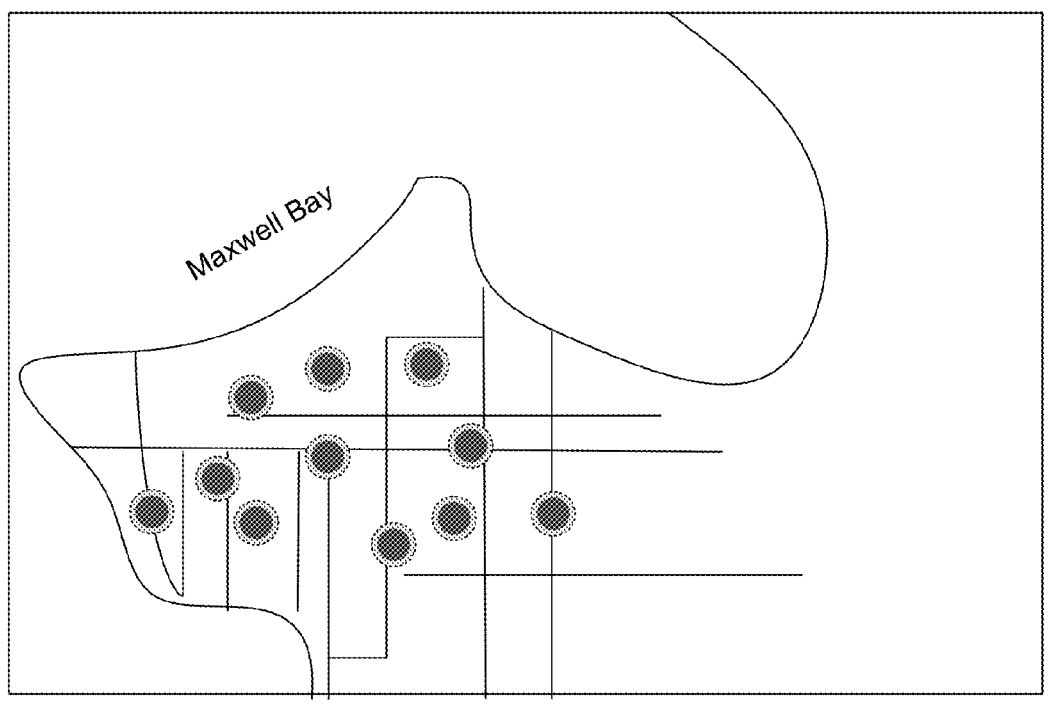
FIG. 11 illustrates a map in accordance with one or more embodiments.

FIGS. 10 and 11 illustrate a sequence of interactions with POI clusters in accordance with one or more embodiments. Assume in this example that a user has conducted a search and is interested in the POI cluster shown generally at 1000 in the top-most map. Assume now that a user conducts a hover operation by moving their cursor over cluster 1000. In this instance, hovering over a cluster reveals how many POIs it contains. In this example, the cluster contains 11 POIs as indicated in the bottom-most map. Assume now that a user selects cluster 1000. In this case, as shown in FIG. 11, the map is zoomed and the individual POIs are disambiguated into their individual POIs to enable the user to more meaningfully interact with the individual POIs.

In at least some embodiments, in touch scenarios when a user touches a cluster (which is equivalent to a hover input from a mouse device or other pointing device), such as cluster 1000 in FIG. 10, instead of the rendering that is provided in the bottom-most map of FIG. 10, the map is automatically zoomed and during the zooming operation, an animation is rendered in which the number of points of interest is rendered, e.g., "11", and expanded toward the user in a manner in which the number appears to fly off the page until it disappears. This facilitates touch scenarios in which a user's finger would otherwise obscure the number rendered in the bottom-most map of FIG. 10.

Expanding Clusters

In the examples above, the clusters of POIs were disambiguated by spreading or de-clustering the individual POIs in a manner to enable a user to more meaningfully interact with them. Any suitable type of disambiguation processing can be used to spread the individual POIs out. In one or more embodiments, disambiguation techniques can be utilized to attempt to preserve the spatial relationship between the individual POIs. This provides a more organized approach which attempts to maintain the locational or spatial relationships of the POIs.

Figure 12:
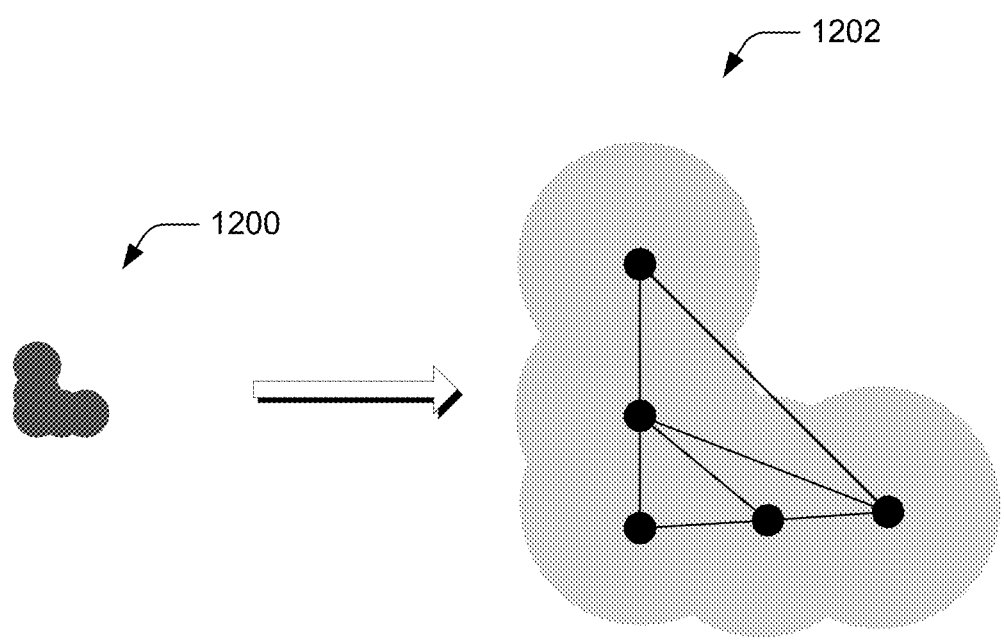
FIG. 12 illustrates a de-clustering technique in accordance with one or more embodiments.

In at least some embodiments, disambiguation techniques are utilized to attempt to preserve the spatial and locational relationships between points of interest when a cluster is expanded. As an example, consider FIG. 12. There, a cluster shown generally at 1200. The cluster represents a grouping of points. The grouping of points has an underlying mesh shown generally at 1202. The mesh is represented by a set of points each associated with a point of interest and one or more lines interconnecting each point with at least one other point. When a cluster is expanded or de-clustered, one or more points of interest are moved away from other points of interest in a manner in which they no longer overlap. In essence, the mesh is inflated so that the points of interest do not overlap yet, at the same time, attempts are made to preserve the shape, i.e. the locational or spatial relationships between the points of interest, as much as possible. Any suitable mesh expansion techniques can be utilized. As but one example, consider the following which utilizes Delaunay triangulation.

Using Delaunay triangulation, the shape of the mesh is expressed as a set of linear equations for which a solution is determined. This problem constitutes, in many instances, an over-constraint problem meaning that there are contradicting equations that cannot all be satisfied.

Using the Delaunay triangulation techniques, the starting point is to consider a set of n overlapping points of interest such as the cluster shown at 1200. Using the set of n overlapping points, the underlying Delaunay triangulation is computed. For each edge (i.e. line connecting two points), the displacement along itself that separates its nodes is computed. Given the list of m node displacements $d_{ij}$, a new layout is computed that preserve the underlying triangulation, i.e. the relative distances between each node is as close to the computed displacements as possible and preserves the center of mass.

This can be expressed as an over-constrained linear system of m+1 equations A.v=d, where A has m+/rows and n columns and encodes edges (and the center of mass); d enumerates the list of m computed displacements (and the center of mass); and v represents the list of nodes as follows:

$$\arg_v \min \left\{ \sum_{ij} |(v_i - v_j) - d_{ij}|^2 + \left| \left( \frac{1}{n} \sum_i v_i \right) - c \right|^2 \right\}$$

The solution of this system (v) can be computed as:

$$v = (A^T A)^{-1} A^T d$$

This process can be repeated if the first iteration still contains overlaps. Utilizing the above approach, the solutions tend to preserve the spatial relationships of the underlying data.

It is to be appreciated and understood that any suitable type of cluster expansion can be utilized without departing from the spirit and scope of the claimed subject matter.

Figure 13:
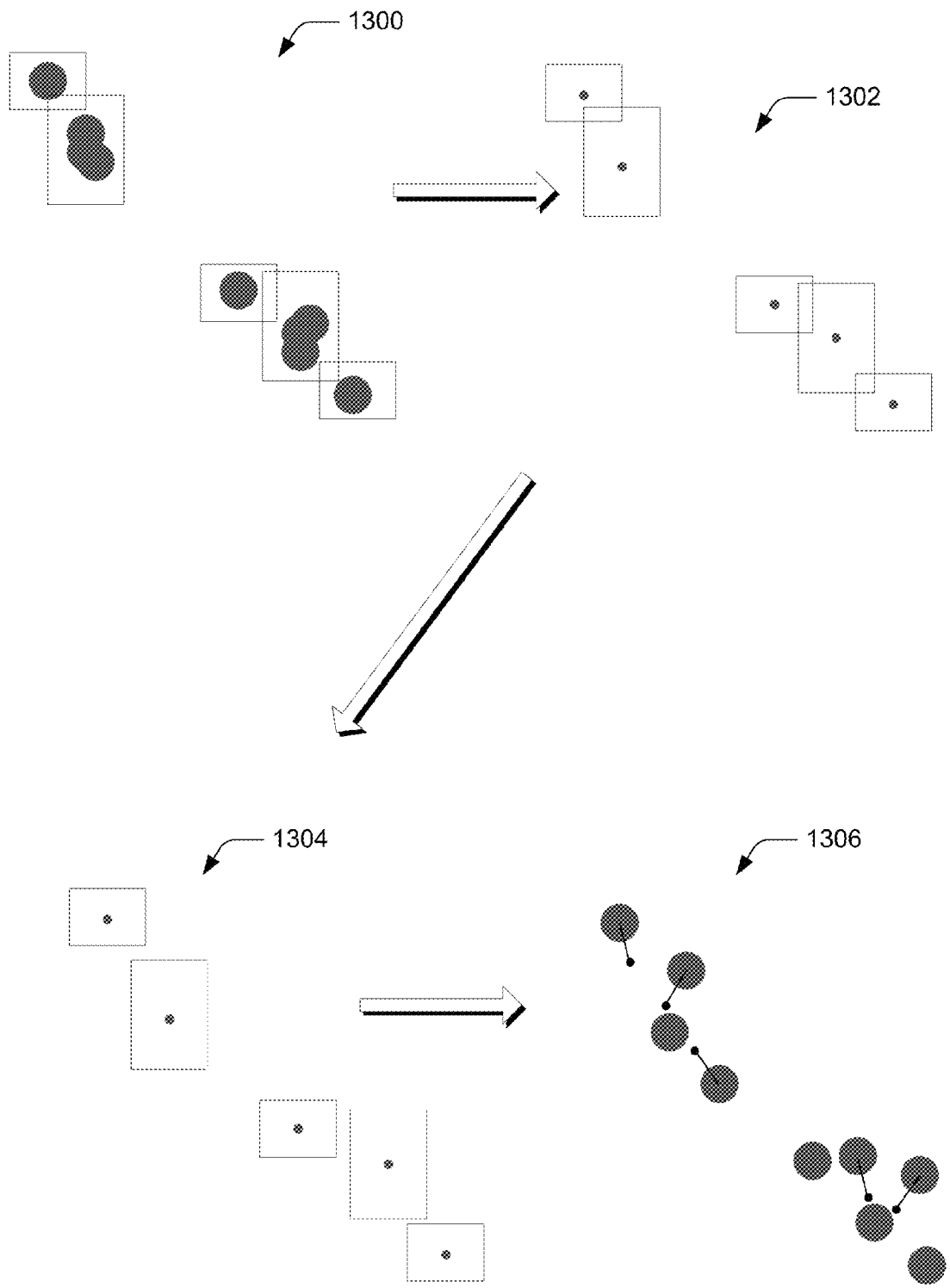
FIG. 13 illustrates a de-clustering technique in accordance with one or more embodiments.

It is to be noted that expanding clusters in isolation can lead to overlapping with neighboring clusters. As an example, consider FIG. 13. Further, a number of points of interest including two clusters are shown generally at 1300. Each point of interest or cluster is surrounded by an expansion box that overlaps other groups. If the illustrated clusters are expanded in isolation, points of interest from the clusters would overlap with neighboring points of interest.

In one or more embodiments, overlap can be reduced or avoided by applying a hierarchical expansion that treats the expansions, i.e. expansion boxes, as overlapping nodes. Such is illustrated at 1302. The expansion boxes, when treated as overlapping nodes, can be expanded using the above described techniques to yield the arrangement shown at 1304. Notice that none of the expansion boxes overlap. Once this is done, at least some expanded nodes are connected to their original locations by a lead line as shown at 1306. Doing so can reduce or avoided entirely occluding points of interest.

Having discussed various embodiments for interactive visual representation of points-of-interest data, consider now a discussion of various methods in accordance with one or more embodiments.

Example Methods

Figure 14:
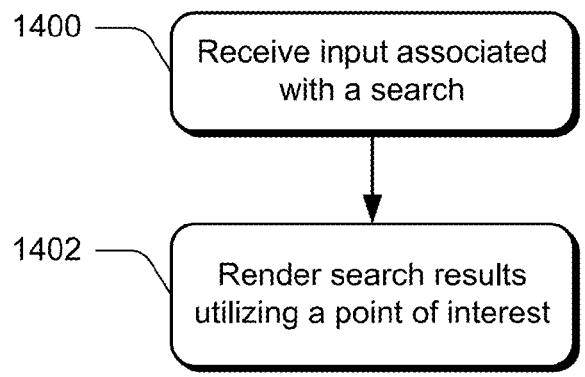
FIG. 14 is a flow diagram that describes steps in a method in accordance with one or more embodiments.

FIG. 14 is a flow diagram that describes steps a method in accordance with one or more embodiments. The method can be implemented in connection with any suitable hardware, software, firmware, or combination thereof. In at least some embodiments, the method can be implemented by a suitably-configured interactive visual representation module 111, such as that shown and described in FIG. 1.

Step 1400 receives input associated with a search. This step can be performed in any suitable way. For example, in at least some embodiments, input can be received by way of an application in the form of Web browser. Any suitable type of input can be received. In at least some embodiments, the input that is received pertains to a search that a user conducts to ascertain one or more points of interest such as an address, business locations, and the like. Step 1402 renders search results utilizing one or more point of interest. In one or more embodiments, points of interest are rendered in a manner which visually changes at different levels of detail (LOD) as a function of zoom level. Points of interest, as described above, include multiple layers at least some or all of which can be visually modified according to the zoom level and associated level of detail. In the illustrated and described embodiments, points of interest include at least a core layer that serves as foreground and a casing layer that serves as the background, as well as potentially other optional layers mentioned above. The dimensions of the core and/or casing levels, as well as other properties such as color or opacity, can be modified as a function of a map's level of detail and state of the point of interest (e.g., hovered, selected and the like), examples of which are provided above.

Figure 15:
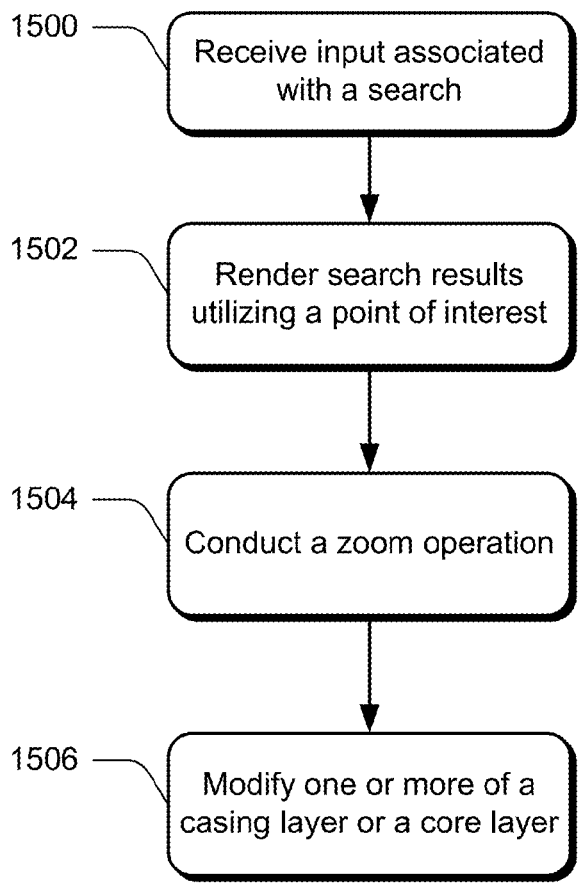
FIG. 15 is a flow diagram that describes steps in a method in accordance with one or more embodiments.

FIG. 15 is a flow diagram that describes steps a method in accordance with one or more embodiments. The method can be implemented in connection with any suitable hardware, software, firmware, or combination thereof. In at least some embodiments, the method can be implemented by a suitably-configured interactive visual representation module 111, such as that shown and described in FIG. 1.

Step 1500 receives input associated with a search. This step can be performed in any suitable way. For example, in at least some embodiments, input can be received by way of an application in the form of Web browser. Any suitable type of input can be received. In at least some embodiments, the input that is received pertains to a search that a user conducts to ascertain one or more points of interest such as an address, business locations, and the like. Step 1502 renders search results utilizing one or more point of interest. Examples of points of interest and how they can be rendered are described above, including the description that appears with respect to FIG. 14. Step 1504 conducts a zoom operation. This step can be performed in any suitable way. For example, a map can be zoomed using a map's navigation controls, e.g., zoom controls, mouse scroll wheel, and the like. Alternately or additionally, a matter can be zoomed by way of input is received from an input device such as a mouse or pointing device, or through a touch input such as a touch-select or pinch gesture. Responsive to conducting the zoom operation, step 1506 modifies one or more of a casing layer and/or a core layer associated with the points of interest. Examples of how this can be done are provided above.

Figure 16:
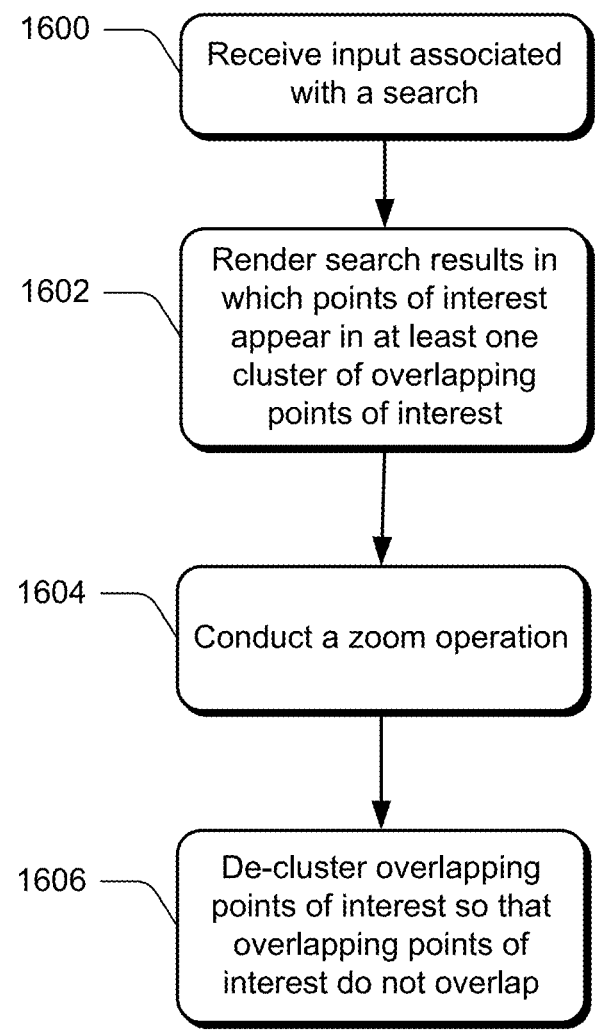
FIG. 16 is a flow diagram that describes steps in a method in accordance with one or more embodiments.

FIG. 16 is a flow diagram that describes steps a method in accordance with one or more embodiments. The method can be implemented in connection with any suitable hardware, software, firmware, or combination thereof. In at least some embodiments, the method can be implemented by a suitably-configured interactive visual representation module 111, such as that shown and described in FIG. 1.

Step 1600 receives input associated with a search. This step can be performed in any suitable way. For example, in at least some embodiments, input can be received by way of an application in the form of Web browser. Any suitable type of input can be received. In at least some embodiments, the input that is received pertains to a search that a user conducts to ascertain one or more points of interest such as an address, business locations, and the like. Step 1602 renders search results in which points of interest appear in at least one cluster of overlapping points of interest. Step 1604 conduct a zoom operation. This step can be performed in any suitable way. For example, a map can be zoomed using a map's navigation controls, e.g., zoom controls, mouse scroll wheel, and the like. Alternately or additionally, a matter can be zoomed by way of input is received from an input device such as a mouse or pointing device, or through a touch input such as a touch-select or pinch gesture. Step 1606 de-clusters overlapping points of interest so that overlapping points of interest do not overlap. Examples of how this can be done are provided above.

Figure 17:
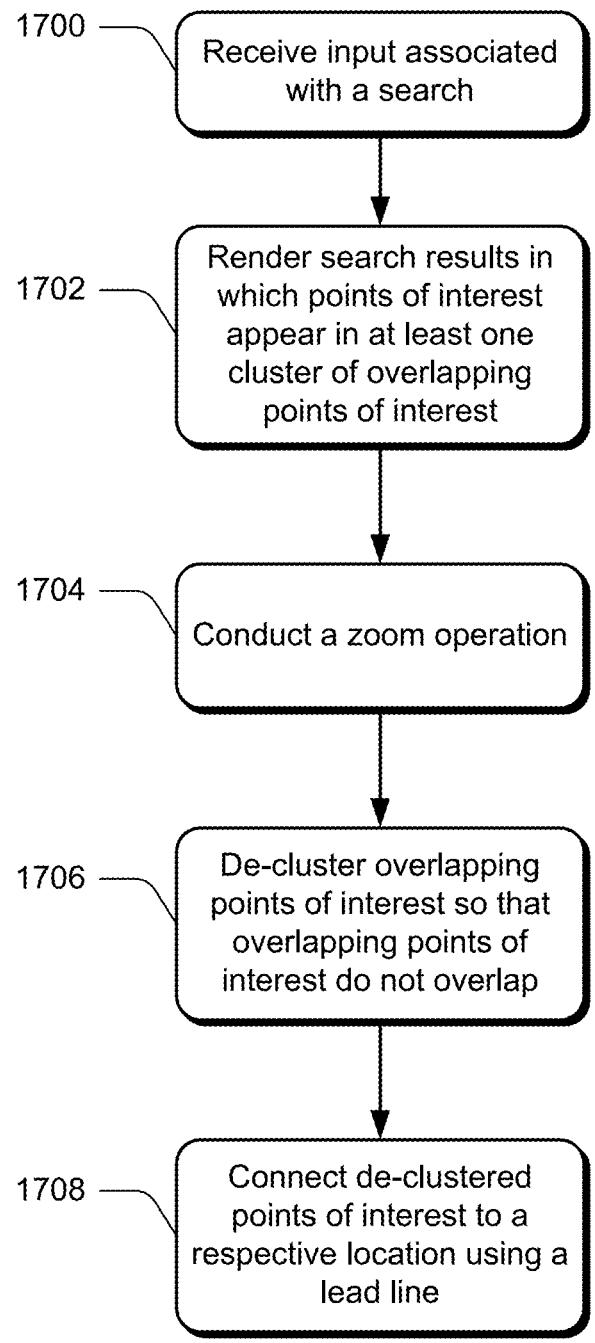
FIG. 17 is a flow diagram that describes steps in a method in accordance with one or more embodiments.

FIG. 17 is a flow diagram that describes steps a method in accordance with one or more embodiments. The method can be implemented in connection with any suitable hardware, software, firmware, or combination thereof. In at least some embodiments, the method can be implemented by a suitably-configured interactive visual representation module 111, such as that shown and described in FIG. 1.

Step 1700 receives input associated with a search. This step can be performed in any suitable way. For example, in at least some embodiments, input can be received by way of an application in the form of Web browser. Any suitable type of input can be received. In at least some embodiments, the input that is received pertains to a search that a user conducts to ascertain one or more points of interest such as an address, business locations, and the like. Step 1702 renders search results in which points of interest appear in at least one cluster of overlapping points of interest. Examples of how this can be done are provided above. Step 1704 conduct a zoom operation. Examples of how this can be done are described above including in the description of FIG. 16. Step 1706 de-clusters overlapping points of interest so that overlapping points of interest do not overlap. Examples of how this can be done are provided above. Step 1708 connects de-clustered points of interest to a respective location using a lead line. Examples of how this can be done are provided above, particularly with reference to FIGS. 5 and 7, as well as other places in this document.

Figure 18:
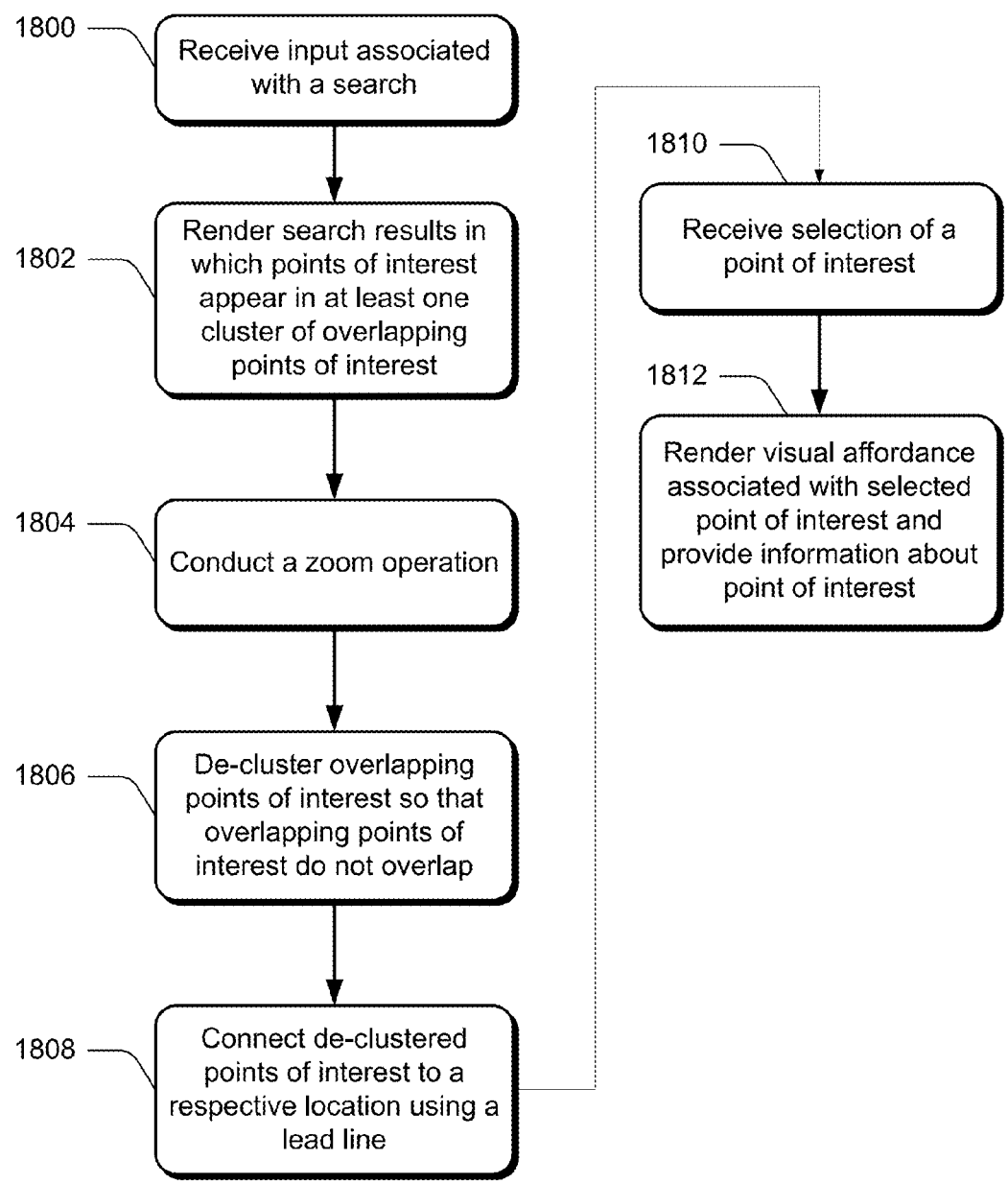
FIG. 18 is a flow diagram that describes steps in a method in accordance with one or more embodiments.

FIG. 18 is a flow diagram that describes steps a method in accordance with one or more embodiments. The method can be implemented in connection with any suitable hardware, software, firmware, or combination thereof. In at least some embodiments, the method can be implemented by a suitably-configured interactive visual representation module 111, such as that shown and described in FIG. 1.

Step 1800 receives input associated with a search. This step can be performed in any suitable way. For example, in at least some embodiments, input can be received by way of an application in the form of Web browser. Any suitable type of input can be received. In at least some embodiments, the input that is received pertains to a search that a user conducts to ascertain one or more points of interest such as an address, business locations, and the like. Step 1802 renders search results in which points of interest appear in at least one cluster of overlapping points of interest. Examples of how this can be done are provided above. Step 1804 conduct a zoom operation. Examples of how this can be done are described above. Step 1806 de-clusters overlapping points of interest so that overlapping points of interest do not overlap. Examples of how this can be done are provided above. Step 1808 connects de-clustered points of interest to a respective location using a lead line. Examples of how this can be done are provided above. Step 1810 receives a selection of a point of interest. This step can be performed any suitable way including, by way of example and not limitation, by receiving a selection via a mouse or pointer device or through touch input. Step 1812 renders a visual affordance associated with a selected point of interest and provides information about the point of interest using the visual affordance. Examples of how this can be done are described in connection with FIGS. 7, 8 and 9.

Figure 19:
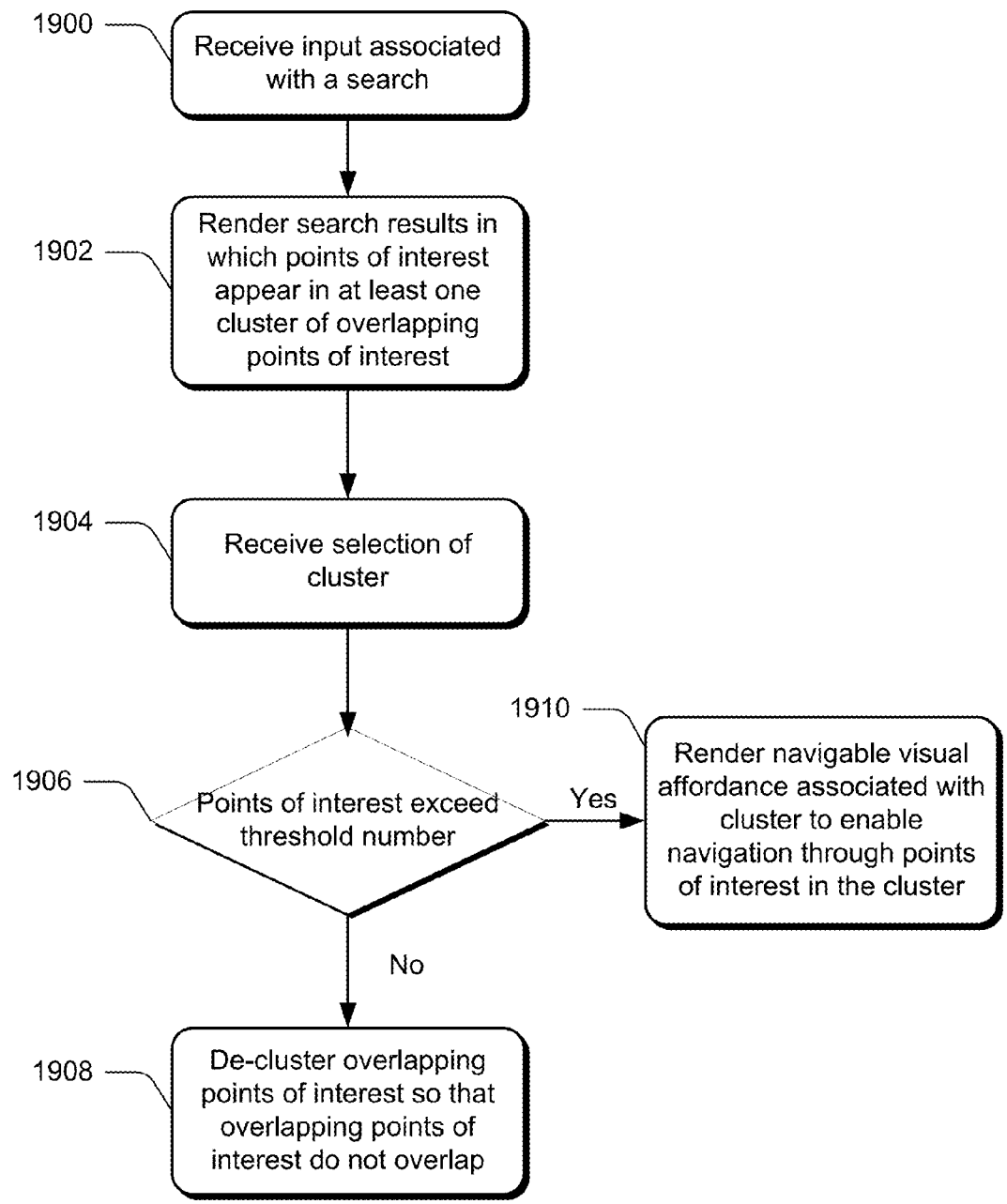
FIG. 19 is a flow diagram that describes steps in a method in accordance with one or more embodiments.

FIG. 19 is a flow diagram that describes steps a method in accordance with one or more embodiments. The method can be implemented in connection with any suitable hardware, software, firmware, or combination thereof. In at least some embodiments, the method can be implemented by a suitably-configured interactive visual representation module 111, such as that shown and described in FIG. 1.

Step 1900 receives input associated with a search. This step can be performed in any suitable way. For example, in at least some embodiments, input can be received by way of an application in the form of Web browser. Any suitable type of input can be received. In at least some embodiments, the input that is received pertains to a search that a user conducts to ascertain one or more points of interest such as an address, business locations, and the like. Step 1902 renders search results in which points of interest appear in at least one cluster of overlapping points of interest. Examples of how this can be done are provided above. Step 1904 receives a selection of a cluster. The step can be performed in any suitable way such as, by way of example and not limitation, through a mouse or pointer device or by way of touch input. Step 1906 ascertains whether points of interest within a selected cluster exceed a threshold number. Any suitable threshold number can be utilized. If the points of interest do not exceed the threshold number, step 1908 de-clusters overlapping points of interest so that overlapping points of interest do not overlap. Examples of how this can be done are provided above. If, on the other hand, the points of interest within a selected cluster exceed the threshold number, step 1910 renders a navigable visual affordance associated with the cluster to enable navigation through points of interest in the cluster. Examples of how this can be done are provided above, particularly with reference to FIG. 8.

Figure 20:
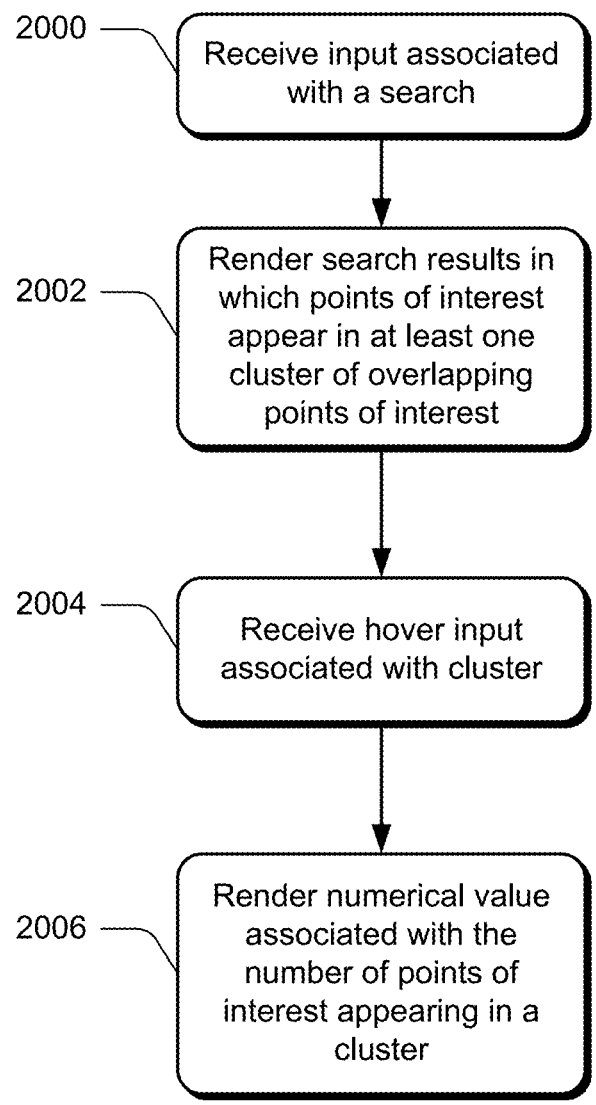
FIG. 20 is a flow diagram that describes steps in a method in accordance with one or more embodiments.

FIG. 20 is a flow diagram that describes steps a method in accordance with one or more embodiments. The method can be implemented in connection with any suitable hardware, software, firmware, or combination thereof. In at least some embodiments, the method can be implemented by a suitably-configured interactive visual representation module 111, such as that shown and described in FIG. 1.

Step 2000 receives input associated with a search. This step can be performed in any suitable way. For example, in at least some embodiments, input can be received by way of an application in the form of Web browser. Any suitable type of input can be received. In at least some embodiments, the input that is received pertains to a search that a user conducts to ascertain one or more points of interest such as an address, business locations, and the like. Step 2002 renders search results in which points of interest appear in at least one cluster of overlapping points of interest. Examples of how this can be done are provided above. Step 2004 receives hover input associated with a cluster. This step can be performed in any suitable way such as receiving input by way of a mouse or pointer device. Alternately or additionally, hover input can be received by way of touch input which touches upon a cluster in such a way to indicate a hover action. Responsive to receiving the hover input, step 2006 renders a numerical value associated with the number of points of interest appearing in a cluster. This step can be performed in any suitable way. In at least some embodiments, a numerical value can be rendered so that it is visually superimposed on top of a cluster. Alternately or additionally, and particularly in embodiments that utilize touch input, a numerical value can be rendered through a suitably-configured animation such as that described above.

Having described various methods in accordance with one or more embodiments, consider now an example system and device that can be utilized to implement the described embodiments.

Example System and Device

Figure 21:
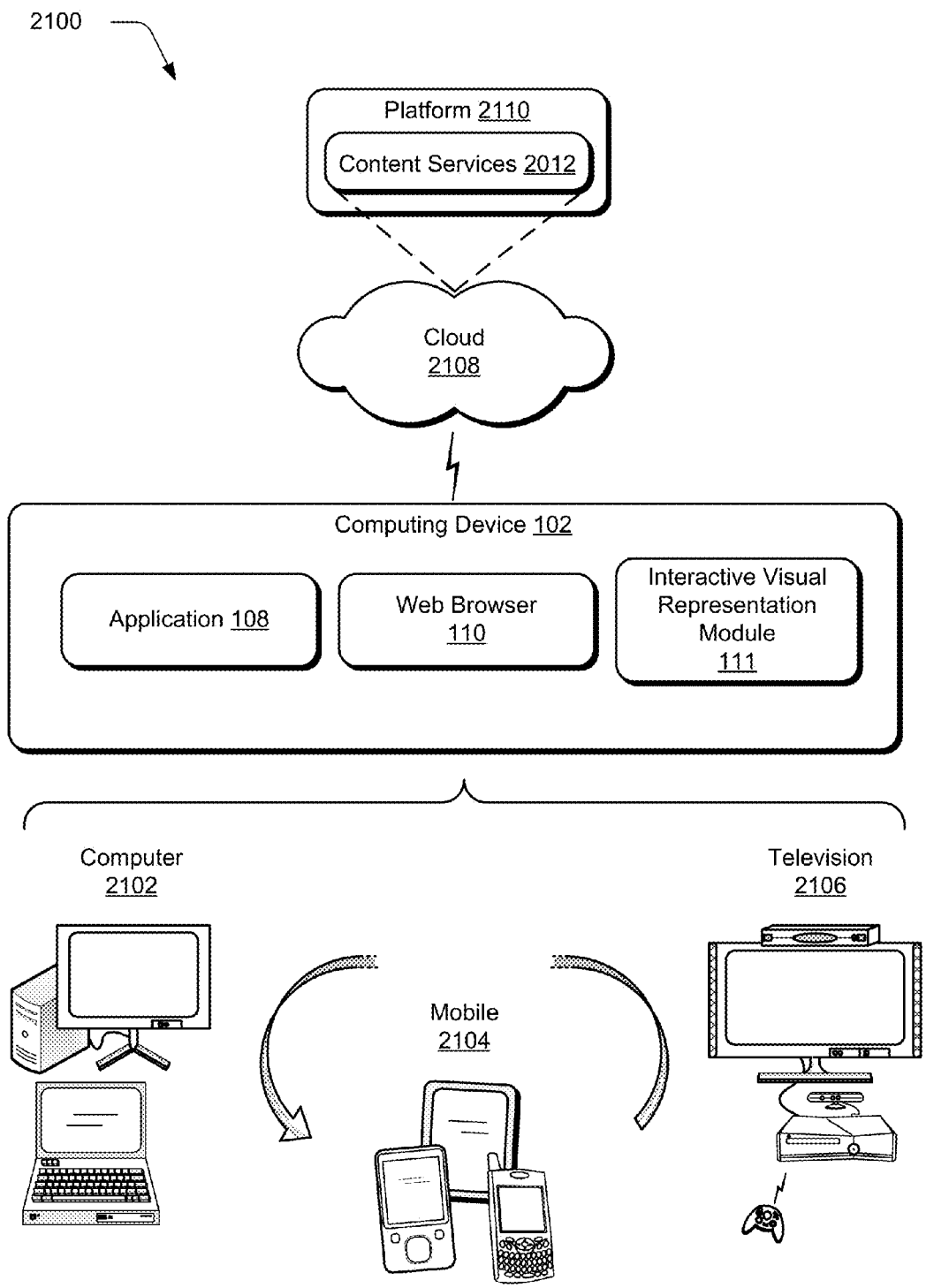
FIG. 21 illustrates an example system in accordance with one or more embodiments.

FIG. 21 illustrates an example system 2100 that includes the computing device 102 as described with reference to FIG. 1. The example system 210 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 2100, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 102 may assume a variety of different configurations, such as for computer 2102, mobile 2104, and television 2106 uses. Each of these configurations includes devices that may have generally different constructs and capabilities, and thus the computing device 102 may be configured according to one or more of the different device classes. For instance, the computing device 102 may be implemented as the computer 2102 class of a device that includes a personal computer, desktop computer, a multi-screen computer, laptop computer, netbook, and so on. Each of these different configurations may employ the techniques described herein, as illustrated through inclusion of the application 108, Web browser 110, and interactive visual representation module 111.

The computing device 102 may also be implemented as the mobile 2104 class of device that includes mobile devices, such as a mobile phone, portable music player, portable gaming device, a tablet computer, a multi-screen computer, and so on. The computing device 102 may also be implemented as the television 2106 class of device that includes devices having or connected to generally larger screens in casual viewing environments. These devices include televisions, set-top boxes, gaming consoles, and so on. The techniques described herein may be supported by these various configurations of the computing device 102 and are not limited to the specific examples the techniques described herein.

The cloud 2108 includes and/or is representative of a platform 2110 for content services 2112. The platform 2110 abstracts underlying functionality of hardware (e.g., servers) and software resources of the cloud 2108. The content services 2112 may include applications and/or data that can be utilized while computer processing is executed on servers that are remote from the computing device 102. Content services 2112 can be provided as a service over the Internet and/or through a subscriber network, such as a cellular or Wi-Fi network.

The platform 2110 may abstract resources and functions to connect the computing device 102 with other computing devices. The platform 2110 may also serve to abstract scaling of resources to provide a corresponding level of scale to encountered demand for the content services 2112 that are implemented via the platform 2110. Accordingly, in an interconnected device embodiment, implementation of functionality described herein may be distributed throughout the system 2100. For example, the functionality may be implemented in part on the computing device 102 as well as via the platform 2110 that abstracts the functionality of the cloud 2108.

Figure 22:
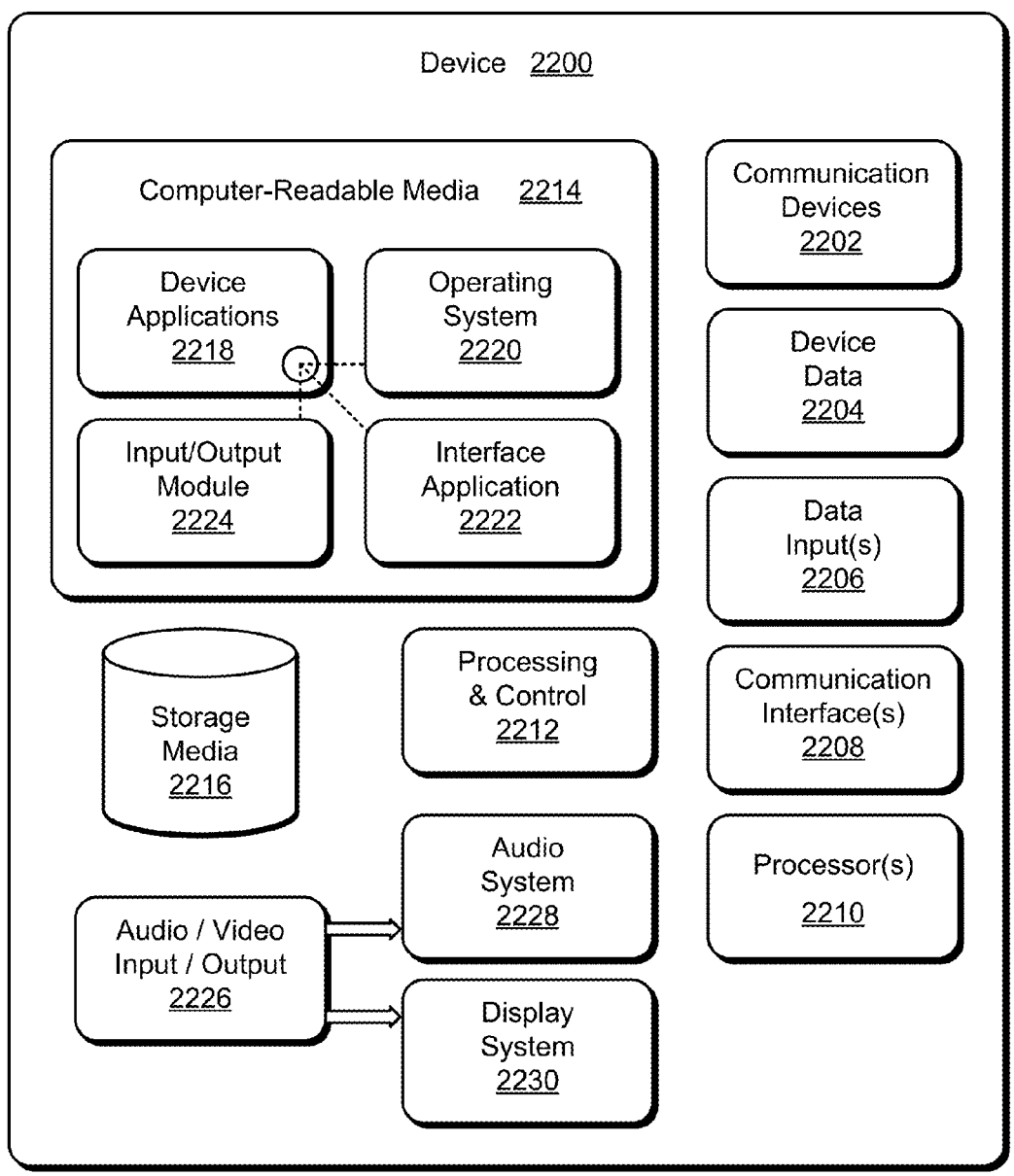
FIG. 22 illustrates an example device in accordance with one or more embodiments.

FIG. 22 illustrates various components of an example device 2200 that can be implemented as any type of computing device as described above to implement embodiments of the techniques described herein. Device 2200 includes communication devices 2202 that enable wired and/or wireless communication of device data 2204 (e.g., received data, data that is being received, data scheduled for broadcast, data packets of the data, etc.). The device data 2204 or other device content can include configuration settings of the device, media content stored on the device, and/or information associated with a user of the device. Media content stored on device 2200 can include any type of audio, video, and/or image data. Device 2200 includes one or more data inputs 2206 via which any type of data, media content, and/or inputs can be received, such as user-selectable inputs, messages, music, television media content, recorded video content, and any other type of audio, video, and/or image data received from any content and/or data source.

Device 2200 also includes communication interfaces 2208 that can be implemented as any one or more of a serial and/or parallel interface, a wireless interface, any type of network interface, a modem, and as any other type of communication interface. The communication interfaces 2208 provide a connection and/or communication links between device 2200 and a communication network by which other electronic, computing, and communication devices communicate data with device 2200.

Device 2200 includes one or more processors 2210 (e.g., any of microprocessors, controllers, and the like) which process various computer-executable instructions to control the operation of device 2200 and to implement embodiments of the techniques described herein. Alternatively or in addition, device 2200 can be implemented with any one or combination of hardware, firmware, or fixed logic circuitry that is implemented in connection with processing and control circuits which are generally identified at 2212. Although not shown, device 2200 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 2200 also includes computer-readable media 2214, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 2200 can also include a mass storage media device 2216.

Computer-readable media 2214 provides data storage mechanisms to store the device data 2204, as well as various device applications 2218 and any other types of information and/or data related to operational aspects of device 2200. For example, an operating system 2220 can be maintained as a computer application with the computer-readable media 2214 and executed on processors 2210. The device applications 2218 can include a device manager (e.g., a control application, software application, signal processing and control module, code that is native to a particular device, a hardware abstraction layer for a particular device, etc.). The device applications 2218 also include any system components or modules to implement embodiments of the techniques described herein. In this example, the device applications 2218 include an interface application 2222 and an input/output module 2224 that are shown as software modules and/or computer applications. The input/output module 2224 is representative of software that is used to provide an interface with a device configured to capture inputs, such as a touchscreen, track pad, camera, microphone, and so on. Alternatively or in addition, the interface application 2222 and the input/output module 2224 can be implemented as hardware, software, firmware, or any combination thereof. Additionally, the input/output module 2224 may be configured to support multiple input devices, such as separate devices to capture visual and audio inputs, respectively.

Device 2200 also includes an audio and/or video input-output system 2226 that provides audio data to an audio system 2228 and/or provides video data to a display system 2230. The audio system 2228 and/or the display system 2230 can include any devices that process, display, and/or otherwise render audio, video, and image data. Video signals and audio signals can be communicated from device 2200 to an audio device and/or to a display device via an RF (radio frequency) link, S-video link, composite video link, component video link, DVI (digital video interface), analog audio connection, or other similar communication link. In an embodiment, the audio system 2228 and/or the display system 2230 are implemented as external components to device 2200. Alternatively, the audio system 2228 and/or the display system 2230 are implemented as integrated components of example device 2200.

CONCLUSION

Various embodiments provide a visual language that enables a continuous representation, at different levels of detail, that range from a single discrete point to multiple points that are near each other or clustered together to unify the look-and-feel of represented elements and provide interactive consistency across various map properties and platforms.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims

What is claimed is:

1. A computer-implemented method comprising:
receiving an input associated with a search;
responsive to receiving said input, rendering search results on a map utilizing one or more points of interest, wherein the one or more points of interest are represented by a given geometry and respective points of interest include both a respective casing layer and a respective core layer, wherein individual casing layers serve as backgrounds of individual points of interest and individual core layers serve as foregrounds on the individual casing layers of the individual points of interest;
changing a zoom level of the map responsive to another user input; and
as the zoom level of the map changes:
changing the color of the individual casing layers of the individual points of interest at different levels of detail as a function of the zoom level; and
changing the size of the individual core layers relative to the individual casing layers while maintaining the geometry of the individual points of interest at different levels of detail as a function of the zoom level.

2. The method of claim 1, wherein the individual casing layers and the individual core layers are circular.

3. The method of claim 1, further comprising:
as the zoom level of the map changes, adding lead lines to the individual points of interest.

4. The method of claim 1, wherein the individual points of interest further comprise content layers having content shown over the individual core layers.

5. The method of claim 1, wherein the individual casing layers are rendered in an ambient color tone that reflects an associated color of the map.

6. The method of claim 1, wherein the individual core layers are rendered relatively smaller when the map is zoomed out.

7. The method of claim 1, further comprising:
as the zoom level of the map changes, rendering the individual points of interest with different visual styles for a default state, a hover state, and a selected state.

8. One or more computer readable storage media embodying computer readable instructions which, when executed by one or more processors, cause the one or more processors to perform acts comprising:
rendering search results on a map utilizing a plurality of points of interest, wherein respective points of interest include both a casing layer and a core layer, and wherein individual casing layers serving as backgrounds of individual points of interest and individual core layers serving as foregrounds on the individual casing layers of the individual points of interest;
conducting a zoom operation; and
responsive to conducting the zoom operation:
de-clustering overlapping points of interest in a cluster so that the overlapping points of interest do not overlap; and
changing sizes of the individual core layers relative to the individual casing layers.

9. The one or more computer readable storage media of claim 8, wherein conducting the zoom operation comprises conducting the zoom operation responsive to receiving a touch input.

10. The one or more computer readable storage media of claim 8, the acts further comprising:
connecting de-clustered points of interest to respective locations using lead lines.

11. The one or more computer readable storage media of claim 10, the acts further comprising:
receiving a selection identifying a selected point of interest; and
responsive to receiving the selection, rendering a visual affordance associated with the selected point of interest and using the visual affordance to provide information about the selected point of interest.

12. The one or more computer readable storage media of claim 11, wherein the visual affordance comprises a pop-up menu.

13. The one or more computer readable storage media of claim 8, wherein the individual core layers increase in size relative to the individual casing layers as the map is zoomed in during the zoom operation.

14. The one or more computer readable storage media of claim 8, the acts further comprising:
responsive to the overlapping points of interest exceeding a threshold number, rendering a navigable visual affordance associated with the cluster and configured to enable navigation through points of interest in the cluster,
wherein said de-clustering is performed in instances when the overlapping points of interest do not exceed the threshold number.

15. The one or more computer readable storage media of claim 8, the acts further comprising:
receiving a hover input associated with the cluster; and
responsive to receiving the hover input, rendering a numerical value associated with a corresponding number of points of interest that appear in the cluster.

16. The one or more computer readable storage media of claim 15, wherein receiving the hover input comprises receiving a touch input.

17. The one or more computer readable storage media of claim 8, wherein said de-clustering is performed using Delaunay triangulation.

18. The one or more computer readable storage media of claim 8, wherein said de-clustering is performed using expansion boxes each of which includes one or more points of interest.

19. A system comprising:
one or more processors;
a display; and
one or more computer readable storage media storing computer-executable instructions which, when executed by the one or more processors, cause the one or more processors to:
render, on the display, search results on a map utilizing a plurality of points of interest, wherein the plurality of points of interest are represented by a given geometry and respective points of interest include both a casing layer and a core layer;
conduct a zoom operation by zooming in on the map; and
responsive to conducting the zoom operation, increase sizes of individual core layers of individual points of interest relative to individual casing layers of the individual points of interest, the sizes being increased while zooming in on the map.

20. The system of claim 19, wherein the computer-executable instructions, when executed by the one or more processors, cause the one or more processors to:
responsive to conducting the zoom operation, change transparency of the individual casing layers while zooming in on the map.

* * * * *